United States Patent [19]

Eickmann

[11] 4,387,866
[45] Jun. 14, 1983

[54] FLUID MOTOR DRIVEN PROPELLER-AIRCRAFT FOR VERTICAL TAKE OFF AND LANDING WITH A MULTIPURPOSE PIPE STRUCTURE

[76] Inventor: Karl Eickmann, 2420 Isshiki, Hayama-machi, Kanagawa-ken, Japan, 240-01

[21] Appl. No.: 229,910

[22] Filed: Jan. 30, 1981

Related U.S. Application Data

[60] Division of Ser. No. 973,780, Dec. 27, 1978, which is a continuation-in-part of Ser. No. 760,006, Jan. 17, 1977, abandoned, which is a continuation-in-part of Ser. No. 487,272, Jul. 10, 1974, Pat. No. 4,009,849, said Ser. No. 487,272, is a continuation-in-part of Ser. No. 104,672, Mar. 8, 1971, Pat. No. 3,825,898.

[51] Int. Cl.³ .............................................. B64C 29/00
[52] U.S. Cl. ...................... 244/7 C; 244/48; 244/56; 244/123
[58] Field of Search .............. 244/7 R, 7 C, 17.11, 244/17.23, 53 R, 56, 55, 60, 123, 124, 48

[56] References Cited

U.S. PATENT DOCUMENTS

| | | | |
|---|---|---|---|
| 1,726,062 | 8/1929 | Gilman | 244/56 |
| 1,842,055 | 1/1932 | Stout | 244/55 |
| 2,514,822 | 7/1950 | Wolfe | 244/60 |
| 2,650,045 | 8/1953 | Hunt | 244/60 |
| 2,708,081 | 5/1955 | Dobson | 244/7 C |
| 2,926,869 | 3/1960 | Sullivan | 244/56 |
| 2,936,968 | 5/1960 | Mazzitelli | 244/7 C |
| 2,988,152 | 6/1961 | Katzenberger et al. | 244/123 |
| 3,181,810 | 5/1965 | Olson | 244/7 R |
| 3,253,806 | 5/1966 | Eickmann | 244/17.23 |

FOREIGN PATENT DOCUMENTS 158433  4/1940  Fed. Rep. of Germany ...... 244/123

*Primary Examiner*—Galen L. Barefoot

[57] ABSTRACT

An aircraft has a pair of tiltable wings for vertical and horizontal flight with propeller-pairs which are driven and synchronized by a fluid transmission between the power plant and the propellers. The interior structure which keeps most of the components of the craft together consists of at least three pipes which are also utilized to carry the driving fluid to and from the motors, to hold the motors and to hold the wings. The pipe structure can be pivoted in respective bearing means of the body of the aircraft to effect the pivotion of the propellers and wings for either vertical take off and landing or for horizontal flight. The take over of a plurality of functions by the interior pipe structure reduces weight and assures safe and economic operation of the craft.

1 Claim, 11 Drawing Figures

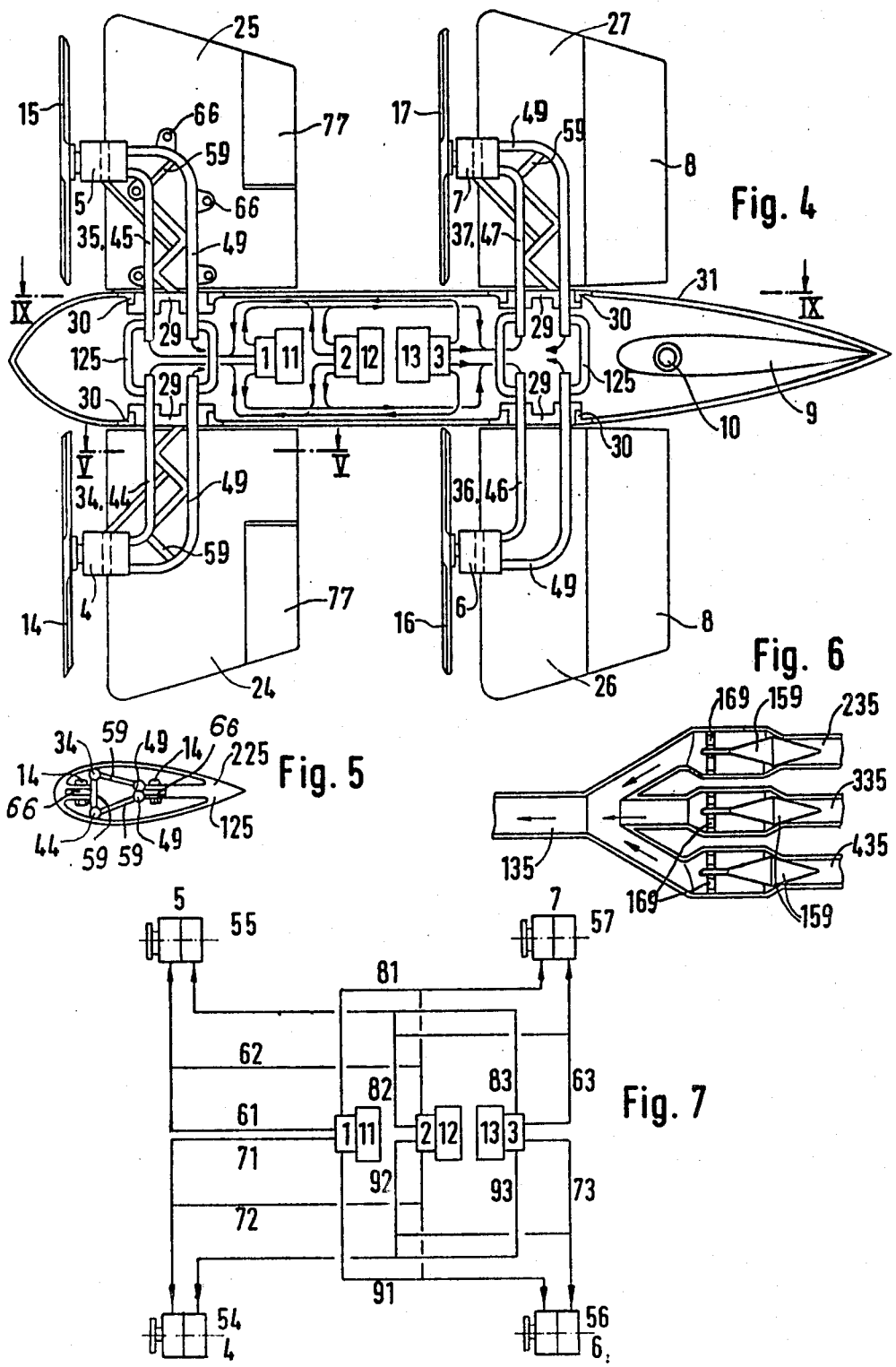

FLUID MOTOR DRIVEN PROPELLER-AIRCRAFT FOR VERTICAL TAKE OFF AND LANDING WITH A MULTIPURPOSE PIPE STRUCTURE

REFERENCE TO RELATED APPLICATIONS

This is a divisional application of my co-pending patent application Ser. No. 973,780, which was filed on Dec. 27th, 1978 as a continuation in part application of that time Ser. No. 760,006, now abandoned and which was filed on Jan. 17th, 1977 as a continuation in part application of my still earlier patent application Ser. No. 487,272, filed on July 10th, 1974 and resulted in U.S. Pat. No. 4,009,849 issued on Mar. 1st, 1977. The mentioned application Ser. No. 487,272 was a continuation in part application of my still earlier patent application Ser. No. 104,676, which was filed on Mar. 8, 1971 and which is now U.S. Pat. No. 3,823,898; partial priority of which is claimed herewith, while the other partial priorities of the mentined earlier or co-pending application(s) are also claimed for the present application. Partially this present application is also a divisional application of my co-pending application, Ser. No. 110,157 which was filed on Jan. 7th, 1980, now abandoned because figure 10 of this application is taken from said co-pending application.

The application Ser. No. 760,006 is now U.S. Pat. No. 4,136,845 and priority of the Austrian application 2060/78 of Mar. 22nd, 1978 is also claimed for this present patent application.

BACKGROUND OF THE INVENTION (a) Field Of The Invention

This application relates to aircraft or vertically and horizontally flying aircraft, which are driven by propellers, which in turn are driven by hydraulic or other fluid motors. The invention relates further to such aircraft which have at least two pairs of tiltable or pivotable wings. In such craft each pair of wings consists of a left side and a right side wing portion. Each wing-portion has at least one propeller which is pivoted together with the wing. St substantial vertical propeller axes and wing-position, the craft can vertically or almost vertically take off and land. At substantially horizontal propeller axes and wing-position the aircraft can fly on wings forwardly. The heretofore known fields of inventions did however never propose an aircraft of the present type.

(b) Description Of The Prior Art

Horizontally moving propeller driven vehicle or aircraft are derived partially from the applications whereof the present application is a respective continuation or divisional application. For example, they are shown in my U.S. Pat. Nos. 3,790,105; 3,823,898; 9,983,833 or 4,126,522. Other air-borne vehicles, for example those, where hydraulic fluid motors are driving propellers which may be fastened on pipes, are for example, my U.S. Pat. Nos. 3,211,399; 3,253,806, 3,345,016; 3,497,162 or 3,614,029. My newest aircraft U.S. Pat. No. 4,136,845 whereof the priority is claimed too, discloses retractable propellers in the wings. All these heretofore mentioned patents have hydraulic drives for the propellers.

Differently therefrom there have been attempts to develop vertically take off and landing aircraft with pivotable wings, wherein the propellers are driven by engines directly or by mechanical transmissions which are extended from the engine(s) in the body through the respective wing portion to the propellers.

VTOL=vertically taking off and landing aircraft, as far as the engines to drive the propellers are fastened to the respective wing or portion of the wing have been build and published reports about their capabilities exist. At least one type is build by a commercial aircraft company and the airforce has successfully build and let be published reports about heavy types of such propeller driven VTOL aircraft. The Jet-engine driven VTOL fighter planes are not related to the present invention, because they are not propeller-driven.

More closer related to the present invention, than the aircraft with engines mounted on the wings, are those, where one or more engine(s) is (are) mounted in the body of the aircraft and mechanic transmission means are extended from the respective engine in the body to the propeller(s) on the wings. The most closely related aircraft of the last mentioned types are for example shown in the following patents:

U.S. Pat. No. 3,181,810—Olson, whereof also a Canadian patent exists, shows two pairs of wing portions which each have a propeller. Plural engines are mounted in the body and drive a transmission means in common, which is a mechanical transmission. The mechanic transmission extends from the engines through a portion of the body and through portions of the wings to the propellers to drive them. While the patent describes the arrangement in great detail, it also discloses, that a great number of parts are required, which together make a very heavy weight. The wings are needing additional structures and bearings must bye provided for the propellers to hold them. The patent fails to give an overall weight—lift balance of the craft. It can not be seen, how much the craft would be able to lift after it has to carry all the many heavy parts of the transmission, wing structure and propeller shaft bearings.

U.S. Pat. No. 2,708,081—Dobson shows an aircraft witih each one wing portion extending to the right and left of the body. The wings are however, borne on pipes which are inside of each other and the drive shaft is full and inside of the inner pipe. The pipes, which bear the wings are borne in separated bearings on each side of the body of the craft. The there disclosed pipes must be either of big diameter to be able to carry theload of the wings and the thrusts of the propellers, which would require heavy weight of the pipes. Or there would have to be additional structures of heavy weight to make the wings stable. In addition the bearing capacity of the single bearings for each side wardly extending wing-pipe set can be only limited. The craft in addition needs still too many heavy parts to become economical and the patent fails also, in the same way, as Olson, to disclose an overall lift-weight balance.

Other former art exists in several patents, which show specific details, but which do not appear to be closely related to the present invention. Those are, for example;

U.S. Pat. No. 1,858,011,Zerbi discloses double - coaxial propeller drive means which are of mechanical nature.

U.S. Pat. No. 3,797,783 - Kisovec discloses propellers on the wing tips, which are mechanically driven and which can be pivoted from vertical to horizontal.

U.S. Pat. No. 3,514,052 - Mc.Keown discloses pivotable propellers on fixed wings, namely on the tips of the wing portions.

U.S. Pat. No. 3,165,280 - Shao - Tang Lee discloses horizontally-vertically collapsible wing portions.

U.S. Pat. No. 2,988,152—Katzenberger discloses pipes in wings, which are exclusively laterally of each other and which lead compressed air or gases to the ports on the wings on the ends of the wings. There the ports are bend in a rearward direction to supply a forward thrust to the aircraft by the rearwards directed outflows of the air or gases.

German Pat. No. 1,299,535—Hiller also discloses pivotable wings, which carry propeller-driving engines.

U.S. Pat. No. 3,861,623—Fruechte discloses two propellers which are synchronised for their rotary speeds by a hydrostatic transmission means or synchronization means.

German Pat. No. 1,275,874—Young again discloses propeller driving engines on the tips of pivotable wings.

However; all of the mentioned patents of the former art are failing to give an exactly examinable overall lift-weight balance.

They all, as far as they are for pivotable wings, are however demonstrarting the direction of the affords of the former art. They were exclusively directed to mechanical transmission means or to propeller-driving engines on the wings.

It is applicant's discovery by the present invention, that the devices of the former art are uneconomic for vertical take off aircraft for the average citizen with an average income and budget. The craft of the former art are too expensive in operation. Because their too heavy weight requires to expensive, strong engines of little weight. Because the required parts in the craft are too many and the sum of their weights is too heavy to permit an inexpensive engine of only limited horsepower with small fuel consumption.

SUMMARY OF THE INVENTION

The invention aims, to overcome the limitations and difficulties of the former art and to provide a very safe vertically taking off and landing, but horizontally flying aircraft for the average person or for economic use in industrial or higher capacity applications.

The invention discloses in great detail a preferred embodiment of the invention and in it the invention does away the many heavy parts of the former art. It applies only very reliable and simple means of little weight. In its aim to spare the heavy operation costs of the fuel consuming heavy weight machines of the former art, the invention starts off with a clear analysis of what is important for the vertical take off and landing and what applies at the later forward flight on the wings.

At common aircraft-technology it was assumed, that it would be the most economic way to drive a propeller by mounting the propeller directly onto a flange of a crankshaft of the aircraft engine. By setting the propeller directly onto the crankshaft of the engine losses of transmissions should be prevented. Because, when a transmission is used between an engine and a means driven by the engine, there will be losses in the transmission.

This assumption of the common aircraft technology, which makes at the first glimpse the impression of being absolutely true - simply because it is true that a transmission has losses - is however, as the inventor of this application found, under certain circumstances a disastrous error, which has considerably prevented the advancement of flight - technology.

This will be visible at hand of FIG. 1 of this specification.

The impulse which is given by the helicopter rotor or by the aircraft propeller to the air which flows through the propeller-circle downward or backward and which either provides the lift or the thrust to the helicopter or to the aircraft, is:

$$I = m2V_1 = 2\rho F V_1^2 = H = S. \quad (1)$$

The kinetical energy in the air-stream behind the propeller is:

$$E_k = \frac{m}{2}(2V_1)^2 = 2\rho F V_1^3 = N. \quad (2)$$

Equation (2) can be transformed to V1, to be:

$$V_1 = \sqrt[3]{N/2\rho F} \quad (3)$$

and the "V1" of equation (3) can be used to be inserted into equation (1), whereby the followings are obtained:

$$H = S = 2\rho F \left[ \sqrt[3]{N/2\rho F} \right]^2 \quad (4)$$

or: $H = S = 2\rho F \sqrt[3]{N/2\rho F} \sqrt[3]{N/2\rho F}$ or: $H^3 = S^3 = 8\rho^3 F^3 \dfrac{N}{2\rho F} \dfrac{N}{2\rho F}$ or: $H^3 = S^3 = \dfrac{8}{4} \rho F N^2$ or: $H = S = \sqrt[3]{2\rho F N^2} \quad (5)$ or: $N = \sqrt[3]{S^3/2\rho F}. \quad (6)$ In the above equations the following values may be used:

$\rho$ = density of air (for example: in kg s$^2$/m$^4$)
N = Power (for example in kgm/s)
S = H = lift of thrust (for example; in Kg.)
I = Impuls (for example in Kg.)
V1 = velocity of the air in the propeller-circle (f.e. in m/s)
m = mass of air in the flow (for example Kgmass = Kg/9,81
F = are of propeller-circle (for example in m$^2$.).

As a first step to explain my invention, I introduce "M" which shall define the number of propellers, which will be used in my craft. For comparison with conventional helicopters it should be understood, that equal diameters of propellers are considered. Also the forms, pitches, configurations and like shall be the same, when propellers are compared.

As second step I introduce the efficiency of a transmission and call it "$\eta$". The transmission may also be my hydraulic transmission of a plurality of separated flows of fluid of equal rate of flow in the flows.

I now introduce "$\eta$" and "M" into equation (5) whereby equation (5) transforms to:

$$H = S = M \sqrt[3]{2\rho F \left(\frac{\eta N}{M}\right)^2}. \quad (7)$$

This equation (7) now shows already some very interesting surprises, which will be found to be important means of the present invention. For example:

The equaition explains, that the lift is as greater as the number "M" of the propellers is.

And, the equation has the further surprise, that the lift will not be reduced parallel to the losses in the transmission, but only with the third root of the second power of the efficiency-losses.

These features, which my equations explaines, are obtained at the given power. Or, in other words, my equations shows, that, when a certain power is available, the lift or ability to carry, of an airborne craft will increase, when the number "M" of the propellers is increased and when done so, the losses which may appear in a transmission which transfers the power to the plurality of propellers will not reduce the lift or carrying capacity in the same ratio as the losses reduce the power in the transmission, but less, namely only with the third root of the second power.

In short, my equation shows, that with increasing the number of the propellers, an increase of lifting capacity or of carrying power can be obtained.

As a next step to explain my invention, I assume, that in equation (7) equal values will be used for a comparison of a conventional helicopter with a plural propeller - craft of my invention. Equal values in equation (7) mean, equal power "N", equal values "2"; equal values of density "$\rho$" and equal values of propeller-dimensions, including equal values of cross - sectional areas "F" through the propeller-circles. For a comparison of flight-technology—systems the equal values can simply be left out of equation (7) and I so obtain my comparison equation (8) which shows my comparison-factor "Ftl"; namely:

$$F_{TL} = M\sqrt[3]{\frac{\eta^2}{M^2}} \quad \text{or:} \quad F_{TL} = \sqrt[3]{M\eta^2}. \quad (8)$$

With this equation it is possible to calculate a comparison diagram, wherefrom the comparison factor "Ftl" can immediately be seen and which shows, how many times lift a machine with a certain number of propellers and a certain transmission efficiency will give compared to other or conventional craft. This diagram will be shown in FIG. 17.

The common helicopter has the Ftl value 1 minus the mechanic transmission losses and minus the power which is requred to drive the tail rotor. In short, the common helicopter may have a Ftl value of 0.75 to 0.85. Herebefore the thrusts, lift-forces, thrust-forces and power for the obtainement of certain forces have been calculated for the condition, that the propeller(s) does/do not move in the direction of the axes. In other words, the equations above are valid for propeller(s) in stand, but not for propeller(s) in movement in the direction of the axes of the propellers.

At the later to be discussed range of flight the craft moves substantially forward in lewelled hight speed flight, where the resistance of the craft in air at the respective speed is in balance with the traction of the propeller(s). I call this range the "flight-range". Contrary thereto, the range where the propeller does not move, where the propeller is at stand or where the craft is hovering, in short, where the above discussed equations apply, we have an other range, which I call the stand-range or the howering-range.

But, according to my "Handbook of my Flight-Technology" there is another range, a range between the stand-range and the flight-range. This range therebetween is called the "inter-thrust-range" in my handbook.

At this Inter-Thrust-Range the craft may permanently change its speed, for example, accellerate. The Inter-Thrust-Range can thereby also be assumed to be an accelleration-range.

At the said "Inter-Thrust-Range" the thrust of the propeller(s) is gradually decreasing when the velocity of the craft increases. The details of this situation and condition are exactly defined by my following equations for thrust of a propeller or of propellers in the inter-thrust-range:

$$S_i = 2N_{in} \times \eta_6 / \left(V_o + \sqrt{V_o^2 + \left[\sqrt[3]{16\rho MFN^2}/\rho MF\right]}\right) = Kg_i \quad (9)$$

or:

$$S_i = 2N_{in} \times \eta_6 / \left(V_o + \sqrt{V_o + 2S_{ibm}/\rho MF}\right) = Kg. \quad (10)$$

The development of the above equations for the Inter-Thrust-Range can be seen in my "Handbook of my Flight-Technology". The first equation of the two equations, namely equation (9) is the more simple equation in actual calculation. The latter equation (10) is the more accurate equation, but it is more difficult and more time consuming in actual calculation procedure.

At the later "Flight—range" when the craft is flying substantially horizontally in levelled flight parallel to the surface of the earth, and, when the resistance of the aircraft during move in air is in balance with the traction force(s) of its propeller(s); or, in other words, when thrusts of the propellers equals resistance of the craft, but thrusts and resistance are oppositionally directed, the following equation is valid:

$$W = (\rho/2)C_w A V_o^2 \quad (11)$$

and further, also the following equation will be applicable:

$$N = W \times V_o. \quad (12)$$

I now insert equation (11) into equation (12) and obtain:

$$N = (\rho/2)C_w A V_o^2 V_o; \quad (13)$$

which I transform to:

$$V_o = \sqrt[3]{2N_{out}/\rho C_w A} \quad (14)$$

whereby I have a possibility to immediately calculate the expected velocity of an airborne craft or aircraft in its flight-range.

In the above flight-range equations, the following values may be used:
W=Resistance of craft in Kg.
$p$=Density of air, for example: 0.125 Kgs$^2$/m$^4$ close to oceanlevel;
A=Projection of wings (airfoil) in m$^2$
Cw=Coefficient of resistance; dimensionless;
N=Power in Kgm/sec;
Vo=Velocity of craft relative to air in m/sec.

Equation (14) can also be written in the following form:

$$V_o = \sqrt[3]{\frac{1}{A}} \times \sqrt[3]{2N_{out}/pCw} \quad (15)$$

The latter equation shows directly the influence of wing-area projection and also the influence of power and of the permanent values for the range of flight. For further defining the influence of power and the influence of the permanent values, the equation (15) may also be written as:

$$V_o = \sqrt[3]{\frac{1}{A}} \times \sqrt[3]{2N_{out}} \times \sqrt[3]{\frac{1}{pCw}} \quad (16)$$

and thereby all important influences for the speed which can be obtained in the flight range are directly visible.

With the above equations all conditions for vertical take off, for vertical landing, for the accellerations at the Inter-thrust-range and for actual horizontal levelled flight can be pre-determined and be exactly calculated in advance. The substantial correctness of the equations has been prooven in actual testing in the inventor's laboratory.

With these equations diagrams can be developed which show in detail and in advance which kind of craft are the most economical for take off and for flight.

From said equations and diagramms it can be found, that even, when a hydrostatic transmission of the inventor's hydraulic systems are arranged between a power plant, like an engine or a gas-turbine and a plurality of propellers, a substantially higher lifting capacity can be obtained then would be obtainable at the same power installation from a single propeller, if flanged onto the crank-shaft of the power plant. This is at least true for the vertical start or take off, for the substantially vertical landing and for flight with moderate forward speed. Only at a high forward speed will the single propeller per engine be of higher economy.

Consequently, it is more economical, according to this invention, to use a power plant to drive or create a plurality of separated fluid flows of substantially proportionate or equal rate of flow and drive thereby a plurality of propellers over fluid motors which are arranged at suitable locations on the craft. These theories are further condition to the fact, that at comparisions equal total power is installed and that the compared propellers have equal dimensions like equal diameters, sizes and pitches. The comparison can not be valid, if in the common craft other dimensions of propellers or power would be used compared to those of the invention.

Therefore, according to the invention, an airborne craft is driven by a plurality of propellers which are driven by hydraulic fluid motors, wherein the fluid motors are driven by separated fluid flows of equal rate of flow which are created in multi-flow pumps or hydrofluid conveying engines and wherein the pump(s) are driven or prime moved by a respective power plant or engine(s).

Accordingly, the invention provides substantially two kind of major airborne craft, namely:
 a vertically lifting and landing multi—propeller—craft; and
 a horizontally staring and landing multi-propeller—craft; wherein at both cases the ability to varify the location or direction of the propellers influence the ability, attitudes and actions of the craft positively and may help to safe fuel and economisize flying.

In the first case, the first preferred embodiment of the invention, the plurality of propellers are utilized, to be set separatedly on wings and thereby to obtain a higher sum of lift by the plurality of the propellers at a given power installation and thereby to obtain an economic vertical take off and landing at a small space.

The propellers are thereby preferredly fastened on shafts of hydraulic motors. The hydraulic motors are preferred to be fastened on fluid-pipe structures, which are pivotably borne in respective bearing means in the body of the craft. Thereby it is possible to pivot or tilt the plurality of propellers in unison between a vertical take off and landing position and a position for substantially forward levelled flight.

According to the invention it is also possible to fasten wings on the mentioned fluid-pipe structure. This safes weight, because the wings do not need any more to have their own bones for the provision of strength and stability. Further, when the fluid-pipe structure pivotes the fluid motors and the propellers, the wings, which are fastened on and borne by the fluid pipe structure and pivoting with it in unison.

A specific feature of this arrangement is, that the wings can be very small, because they do not need to carry the craft up into the air from a runway. The big size wings, which aircraft of common style need, to be able to lift up from the runway at a moderate speed are spared by this present invention, because the craft of the invention can lift off vertically, gradually pivot or tilt its wings to levelled flight condition and thereby obtain forward speed in the Inter-Thrust-range until finally the craft will have obtained a forward velocity high enough to continue to fly on on small wings.

While I have pointed out heretofore, that the equations show, that the craft of the invention is more economic at vertical lift or descent and at moderate speed, it will now be understood, that the aircraft of the invention can also be more economical in operation at high speed, because it needs smaller wings than the common aircraft. The feature of the smaller wing or of the size "A" of equation (15) will now directly demonstrate, that due to the smaller wing, the craft of the invention may even in levelled flight obtain a higher velocity at the same installation of power and thereby become even more economic in substantially horizontal forward flight.

Consequently, since may aircraft take vertically off, because the big size wings are replaced by the vertically acting take-off propellers, the craft ot the invention can at moderate speed also fly with less gasoline consumption than the common aircraft.

This embodiment of the invention spares fuel at the vertical take off and landing compared to the conventional helicopter; and it can, if economically used even spare fuel at flight. It is further easily to be build, inexpensive and safe in operation and its components are reliable. A further spcific feature is, that in the following horizontal flight this embodiment of the invention will consume less fuel than a helicopter of equal carrying capacity would. A helicopter uses at horizontal flight about 50 to 70 percent of the howering or take off fuel. But the craft of this invention may use in horizontal flight with moderate speed only one fourth or less than at take off or landing or at hovering in air. At a moderate velocity of 100 to 150 Km/h speed the craft of the invention may use even less fuel than a common car would use at equal speed. A higher or a considerably higher fuel-consumption is required only at higher speed of 150 to 700 Km/h. This increase in fuel consumption is natural and also appearant from equation 15, which shows, that the velocity increases with the third power of the used power or fuel. In short, a doubling of speed requires an eight times increase of fuel if no other factors reduce this ratio.

Further detailed mathematics, technologies and economic details as well as complete outlays and designs beside of other embodiments of the Flight-Technology of the inventor, which also includes hundreds of fotographs and calculation tables and formulas can be studied in "Handbook of my Flight-Technology" by Karl Eickmann, which can be obtained commercially from:
Rotary Engine Kenkyusho
2420 Isshiki, Hayama-machi;
Kanagawa-ken, JAPAN.

The said Handbook also includes samples of engines and of pumps and motors. The weights of radial piston pumps and motors have been reduced about to one hundredth of equal power at the fifties. The Handbook is a compact short-cut on 600 pages of the 50 million words etc. in test records, scientific literature and other literatures of the inventor, as far as flying of the development of little weight, but powerful and economic components like structures, hydraulic pumps, motors, engines or engine-hydraulic power plants are concenrned.

When the mentioned Handbook is sold out, or for those who cannot afford its expense, the shorter book "Mini introduction to a new technology is recommended."

As will be seen from the description of the preferred embodiment, one major object of the invention is, to set a pipe structure with pipes into at least two directions of planes which are vertically relatively to each other, to set ribs between the pipes to strengthen their bearing capacity, to set holding means onto the pipe structure for fastening of the skin of the wings and to apply a plurality of functions and actions to the so obtained pipe structure of the wings. Namely, to lead the fluid to and from the propeller driving motors, to hold the propeller driving motors with the propellers thereon and in addition to form the bone-structure of the wings and to pivot the respective wing portoons. The combination of these plural functions in a single and simple means of a structure obtains the aim of the invention of an economically taking off, stanting and landing aircraft which files forwards on wings. The heavy weight of the craft of the former art are thereby spared and the aircraft itself has been strenghtened and made very reliable and strong.

In an additional object of the invention, the propeller axes are set in a suitable and preferred angle to the zero plane of the body of the craft in order to simplify and ease the transition stage of flight with angularily pivoted wing portions between vertical flight and horizontal flight.

The main solutions of the invention, may therefore be also described as follows:

(1.) In an aircraft in combination; a body, at least one power plant, at least four propellers, at least two pairs of wing-portions, fluid transmission means including fluid motors between said power plant and said propellers to drive said propellers by said motors, means to varify the angle of said wings and propellers relatively to ground, means to synchronize the rotary velocity of said propellers and a novel structure;

wherein said novel structure includes at least three pipes;

wherein at least two of said pipes are utilized as fluid lines to carry fluid to and from said motors;

wherein said structure includes ribs between said at least three pipes to prevent deformation and dislocation of said pipes relatively to each other;

wherein said pipes and said ribs are forming a rigid structure of capability to carry a load, wherein the outer ends of at least two of said pipes are connected to ports of one of said motors;

wherein said structure carries and holds on said outer ends of said pipes at least one of said motors;

wherein holding means are provided on said structure, wherein said holding means are utilized to hold and carry at least one of said wing-portions;

wherein said structure includes a pivotable bearing means;

wherein said bearing means is carried in a bearing housing provided on said body, wherein the inner ends of at least two of said pipes are flexibly connected to ports of a pump means in said transmission to carry fluid from said pump to said pipes and vice versa;

whereby said structure provides in combination the holding of said motor, the holding of said wing, the temporary varification of the relative angles of said propellers and of said wings relatively to the ground, the transfer of motor-driving pressure fluid to said motors to drive said propellers and the carrying of said body by said wings and said propellers during operation of said aircraft in the air.

(2.) In an aircraft in combination;
a body, at least one power plant, at least four propellers, at least two pairs of wing-portions, hydrostatic fluid transmission means including a pump arrangement and fluid motors between said power plant and said propellers to drive said propellers by rotors of said motors with one propeller each fastened to at least one rotor of one of said motors, means to varify the angles of said wing-portions and propellers relatively to the ground, synchronization means in said hydrostatic transmission means to synchronize the rotary velocities of said propellers and a novel structure in a plurality of such novel structures;

wherein said novel structure includes at least three pipes;

wherein one of said pipes is located laterally of the other two of said at least three pipes;

wherein said structure includes ribs between said at least three pipes to prevent deformation and dislocation of said pipes relatively to each other;

wherein said pipes and said ribs are forming a rigid structure of a capability to carry a multi-directional load of at least two components of directions of load whereof one of said components is substantially normal to the other of said components of directions of load;

wherein said pipes with the exception of a probable slight inclination relatively to each other are substantially parallel to each other and are of diameters of a fraction of the distances of their axes from each other;

wherein the outer ends of at least two of said at least three pipes are connected to ports of one of said motors;

wherein said structure carries and holds on said outer ends of said pipes at least one motor of said motors;

wherein at least two of said pipes are utilized as hydrostatic fluid delivery—and fluid return—lines to lead fluid from said pump arrangement to said motor and from said motor at least indirectly back to said pump arrangement;

wherein holding means are provided on said structure;

wherein said holding means are utilized to hold and carry at least one portion of said wing-portions;

wherein said structure includes a pivotable bearing means;

wherein said bearing means is pivotably borne in a bearing housing which is provided on said body;

wherein said pump arrangement delivers plural separate fluid pressure flows of proportionate rates of flow equal in number to the number of said motors and equal to the number of said propellers;

wherein each of said delivery fluid lines passes one of said separate flows of proportionate rate of flow to one of said motors to assure by said proportionate rates of flows proportionate angular rotary velocities of the rotors of said motors and thereby of said propellers; and;

wherein the inner ends of at least two of said at least three pipes are movably connected to ports of a pump means of said pump arrangement in said transmission to lead fluid from said pump arrangement to said pipes and vice-versa;

whereby said structure provides in combination;
a; the holding of said motor;
b; the holding of said wing-portion;
c; the temporary varification of the relative angle of said propeller and of said wing-portion relatively to the ground and to said body;
d; the transfer of motor-driving pressure fluid of a rate of flow proportionate to the respective rate of flow of fluid in an other structure of said plurality of structures to and from said motor to drive said propeller with a rotary angular velocity proportionately relatively to the rotary angular velocity of an other of said propellers and whereby said structure also provides
e; the carrying of said body by said wing-portion and said propeller during operation of said aircraft in the air. or, as:

(3.) The aircraft of 2,
wherein two of said structures are combined together on their inner portions to form a common structure with oppositionally directed outer portions, wherein connecters which include at least three medial connection pipes are provided on the inner portions of said structures to connect said structures rigidly;

wherein each of said inner portions of said structures is provided with one of said bearing means and wherein said bearing means are pivotably borne in a pair of bearing housings of said body.

(4.) The aircraft of 3,
wherein said medial pipes of said connecters are fastened to said pipes of said two of said structures in a small distance from the said inner ends of said pipes of said structures and said medial connection pipes of said connecters include laterally bended portions on the ends of said medial connecter pipes to permit open inner ends of said pipes of said structures for cleaning of the interiors of said pipes and for smooth connection of said pipes to at least partially movable fluid lines between said inner ends of said pipes of said structures and said pump means of said pump arrangement, while said medial connection pipes form between said bended portions on their ends medial connecter portions of substantially parallel axes and one of said medial connecter portions laterally to others of said medial connecter portions.

(5.) The aircraft of 3,
wherein at least two of said combined structures are provided, one thereof on the front-portion and one thereof on the rear portion of said aicraft,
whereby said aircraft obtains at least four propellers and at least for wings with each two thereof oppositionally directed and located relatively to the longitudinal medial vertical plane through the body of said aircraft.

(6.) The aircraft of 5,
wherein a common control means is provided and attached to said structures to incline the angles of said wings and the axes of said propellers in unison in proper relation to each other relatively to the ground and to said body.

(7.) The aircraft of 2,
wherein the axes of said propellers are slightly inclined relatively to the angle of attack of said wings.

(8.) The aircraft of 5,
wherein said propellers have diameters in proper relation to the length of said wings in order to create a lifting effect on said wings by the stream of air which is blown by said propellers over said wings.

BRIEF DESCRIPTION OF THE DRAWINGS

FIG. 4 shows a simplified horizontal sectional view through an example of a vertically taking off and landing, but horizontally flying aircraft of the invention, whereat hatching lines are spared in order to make the figure not to small and not too overloaded with lines;

FIG. 5 is a cross-sectional view through FIG. 4 along V—V;

FIG. 6 shows a longitudinal sectional view through a flow-combination valve set whereby a multiple of flows from different power sources are combined to a single continuing combined flow;

FIG. 7 shows a schematic of a sceleton for driving four double-motors of a craft of a craft of the invention;

In FIG. 1 the air-stream through a propeller circle is shown, as known from the conventional air-stream theory. In one portion of the figure for a vertical axis of the propeller for a vertical air-stream at hovering of the craft. In the other portion of the figure for a propeller with horizontal axis and horizontal air-stream through the propeller circle as in forward flight. In the one portion of the figure the forward velocity "Vo" of the craft and thereby of the propeller is "zero" namely in the right portion of the figure. But in the left portion of the figure the forward velocity "Vo" of the craft and thereby of the propeller is "Vo".

Figure 1:
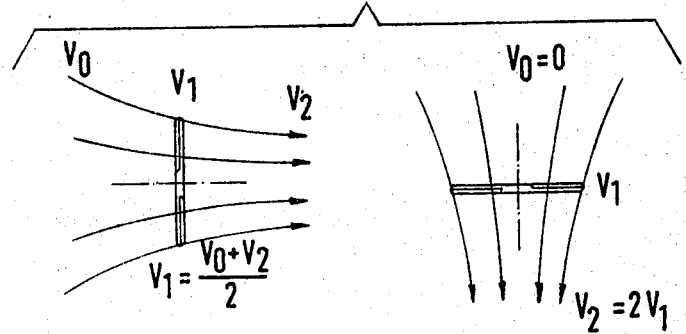
FIG. 1 shows the air-stream through a propeller-circle as it is known from the conventional air-stream theory; namely in one schematic at vertical hovering in the air and in the other diagram at forward flight with the velocity Vo as forward—speed of the craft.

Consequently, as known from the literature, the velocity through the propeller-circle is in the right part of the figure="V1" which corresponds to "V2/2" when "V2" is the velocity of the air after the propeller. And in the left part of figure the velocity of the air through the propeller circle is also "V1∞ but this "V1" corresponds now to: "V1=(Vo+V2)/2". Since these facts are generally known from the air-stream literatures, the FIG. 1 contains nothing new. It is however contained in this application in order to explain, that these facts are the bases of the mathematics and of the formulas. For example, the right part of FIG. 1 is the basis for equations (1) to (8) while the left part of FIG. 1 is specifically the basis for equations (9) and (10). Equations (7) to (10) are not known from the literature. These and other equaitaions can be found in their development again in the "Handbook of my Flight-Technology". Therein many explanations and details are found.

Figure 2:
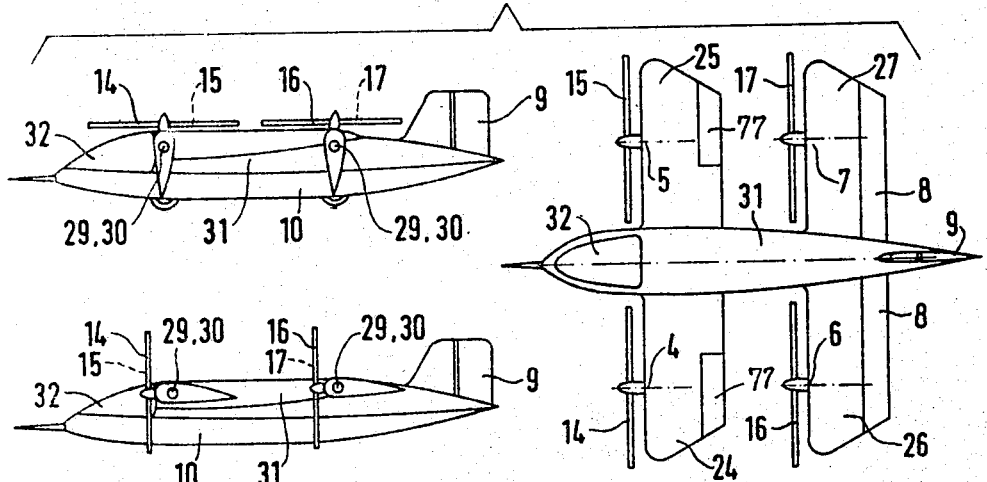
FIG. 2 shows an example of a vertical take off aircrfat of the invention in a scale of approximately 1:100 for one to three persons, wherein the craft is once shown with vertically set wings and propellers and in the other part the craft is shown with horizontally directed wings and propellers for flight and wherein the craft is also shown in the other part of the figure in horizontal flight, seen from above.

FIG. 2 demonstrates a preferred embodiment of a vertically taking off and landing craft of the invention, which can horizontally fly on wings. In the upper part of the figure the craft is shown in vertical flight condition. In the bottom portion of the figure the craft is shown in horizontal flight situation and in the right part of the figure the craft is shown in horizontal flight, but seen from above. In this part the craft may be in forward flight.

In body 31 of the craft the power station 10 is provided and preferred to be located in the medial or in the bottom portion of the craft. It may also be a plurality of single power plants, disposed along the bottom portion of the body. Together with other weights, for example tanks, fuel, oil, pumps, acessory devices and like they are supposed to form a gravity centre in the lower portion of the craft to stabilize the location of the craft in the air by a power play with an upwards acting lifting centre formed by the upwards tracting propellers of the craft.

On the body 31 of the craft are also the pivot-bearing holders 29 and 30 provided. In them the fluid pipe structure is pivotably borne. The fluid pipe structure is however not visible in FIG. 2. In bearings 29,30 the fluid pipe structure which forms the bone-structure for holding the fluid motors and thereby the propellers and also the wings can be pivoted at least from a vertical position to a horizontal position but in preferred embodiments it may also be pivotable into a braking position for braking the speed of flight when suddenly another object nears towards the craft. The wings 24 to 27 are fastened or may be fastened on the fluid pipe structure. The craft can also fly without wings. But then the propellers are kept in an inclined position relatively to the surface of the ground. Therefore it is said, that the wings may be fastened to the fluid pipe structure. But the fastening or application of the wings is not for every craft of the invention a must. The craft may have a side rudder 9 and ailerons 77. Some of the wings may be provided with elevators 8 as shown in FIG. 4 or some of the wings may act as elevators 8.

In the following I will define what actions an airborne craft may do. This will be in accordance with the "Handbook of my Flight-Technology" as follows:
Vertical rest or flight is "hovering".
Forward move is "flight"
and move with inclined propeller axes is "move".
Consequently in the left upper part of the FIG. 2 the craft is shown in "hovering"; at the left bottom portion the craft is shown in "flight" and in the right part of the FIG. 2 the craft is also demonstrated in "flight".The craft is not demonstrated in "move", but a "move" of a craft is demonstrated in FIGS. 10 and 11.

At "hovering" the propeller are forming together a lifting-centre. This is located above the earlier mentioned gravity-centre. The power-play between lift centre and gravity centre keeps the craft in stable position at hovering, while vertical ascent and descent are vertical flight and at such vertical flight the said centres also continue by their power play to maintain the stable location of the craft relatively to the surrounding air. The bottom of the craft thereby remain at all times of hovering and at vertical flight the ascent and descent substantially parallel to the ground and the craft remains upright at all those actions or hovering at rest.

By the fluid line structure or bone-structure of the craft the fluid motors 4 to 7 are borne. The fluid motors may be hydraulic motors in this and the other figures. It could however also be gas or air-motors. These fluid motors are driven by fluid streams. They are driven with equal rotary velocities while motors of diametric locations relatively to the body form motor-pairs of counter directional rotation. Similarly the propellers form propellor-pairs. For example Propellers 14 and 15 form one propeller-pair while propellers 16 and 17 form a second propeller-pair. Naturally, each propeller of the same propeller pair revolves in the opposite direction relative to the other propeller of the same propeller-pair, but both propellers of the same propeller-pair have the same or equal rotary velocity which means, equal revolutions per time, for example, an equal number of revolutions per minute.

An example of the inner structure of the craft of FIG. 2 is given in FIG. 4.

Figure 3:
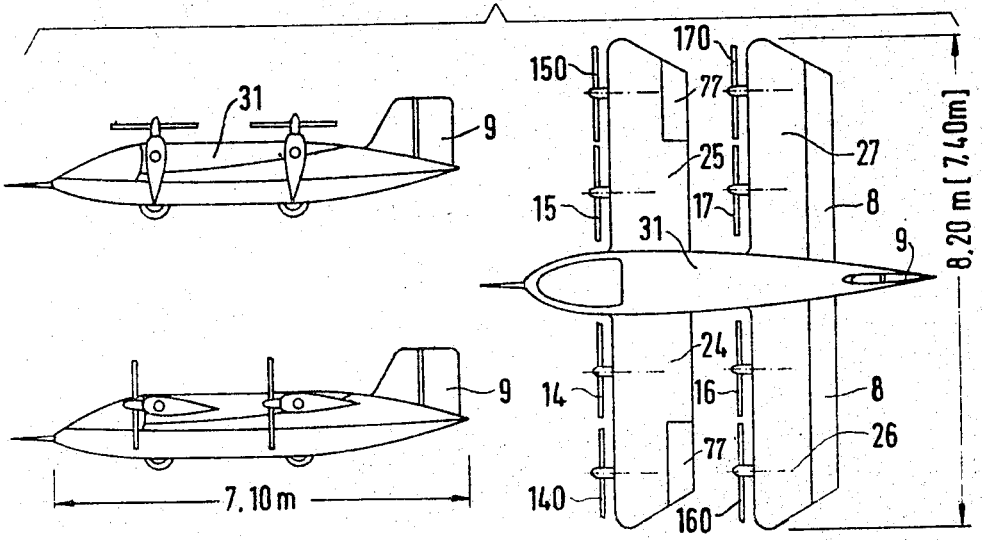
FIG. 3 shows another example, similar to that of FIG. 2, however with eight propellers, while the craft of FIG. 2 has only four propellers.

Also, the design, capability, size, cost and like are functions of time and of the technology of the respective time and of availabilities of the respective time for FIG. 2 as well as for other craft of the invention, especially depending of the technology of the respective power plants and of the respective fluid handling devices of the respective time, the FIGS. 2 and 3 are shown in a scale of about 1:100 in order to give a first idea in which size the craft of the invention can be build. Thus, the figures show first examples of small-size craft which can be materialized with the presently available technology, when the power plants, hydraulic devices and fluid-line structures of the inventor are used. They can not in all cases be realized, when wrong power plants, hydraulic devices or wrongly designed fluid line structures are used. At present time the craft of the invention require the highest standard of technology which is in this specific field presently available only from the inventor's laboratory or from his licensed manufacturing companies.

According to the invention, the craft of the figures cannot only be build in the small size to 1 to 3 persons, but also in larger sizes for many persons or as transport-aircraft. The scale in the figures shall therefore by no means define, that the invention is limited to the small size of the scale of the figures. Greater sizes, larger sizes, higher capable craft are designed and partially build and can be commercially obtained from the inventor or from his licensed firms.

Otherwise the FIGS. 2 and 3 show those craft which at present time can be obtained with smallest expense for 1 to 3 persons or the respective transportation weight. The craft of these figures has enough space in a bigger garage of a car and it can also be build in such bigger garage of a car. The building expenses are less than the costs of nowadays luxury cars. The components for building the craft can be obtained from the inventor. And so can be the drawings together with the "Handbook of my Flight-Technology".

FIG. 3 is also demonstrated in a scale of 1:100. The scale is not in all details absolutely exact. FIG. 3 shows the more elegant and the more desirable solution for the vertically taking off craft compared to FIG. 2. However, FIG. 2 is the more easily build able and less expensive in building presently than the craft of FIG. 3. The craft of FIG. 3 is presently considerably more expensive than the craft of FIG. 2. The craft of FIG. 2 is more easily to be materialized because of the bigger diameters of its four propellers. The propellers ob bigger diameter carry much more and lift much more than the propellers of small diameter at the same sum of installation of power. Consequently it is more easy to take off with the craft of FIG. 2 because with the bigger diameter propellers of FIG. 2 the craft needs less power for the vertical take off and is therefore less in weight, because it needs a smaller number of engines or an engine of less power. The propellers of the sizes for the craft of FIGS. 2 and 3 are nowadays available and can be obtained commercially also from the inventor. The disadvantage of the craft of FIG. 2 is, that the propeller require such big diameters, that the tips of the propellers at horizontal flight are revolving below the bottom of the craft. That can bring difficulties at emergency landings in horizontal flight with horizontal landing on wings, because the tips of the propellers would then meet the ground and the propellers would brake. The craft of FIG. 2 therefore requires for emergency landing on wings an arresting means for the arresting of the propellers in a horizontal position. FIG. 3 on contrary thereto has so small propellers, that the tips of the propellers remain in the air also when the craft lands on wings in horizontal flight and sets onto the ground on the wheels. The craft of FIG. 3 has at least 6 or in the figure 8 propellers. This is required to obtain anough lift with the propellers of such little diameter.

A common feature of both craft, that of FIGS. 2 and 3 is, that the wheels do not need a retraction into the body. Thus, the craft can operate without retractable wheels and simple wheels, which are extending only a little from the body downward are enough for horizontal landing on wings. For vertical landing and taking off no wheels at all are required. However, since the craft has the ability to take off and land, either vertically or horizontally, the little cost and weight of simple non-retractable wheels adds much value to the craft, because it makes the horizontal starting and landing easily possible in addition to the vertical take off and landing. To add retractable wheels or undercarriages is however possible, if so desired.

At non-windy weather the crafts of FIGS. 2 and 3 can take off and land from and into a space of about 10 meter by 10 meter. At windy weather however to land into such a small space, a certain skill of the pilot is required. Another common feature of the crafts of FIGS. 2 and 3 is, that they can fly with high speed as aircraft can do, that the propellers do not need the elastic helicopter blades or not the varyation of pitch during a revolution as the helicopter needs and in addition, that the craft can land at any country place in bad weather, when the bad weather reaches the flying craft remote from an airport. Still another common feature of both craft is, that they can convert to vertical flight, howering or to rest in air or even to brake in the air and to reverse the direction of flight, when another obstacle comes into the flight path of the craft. Accidents are thereby prevented and should not occure without pilot error.

Also the following design details are no matter of the patent claims, they are described here in order to give an idea what sizes are today available in such craft. The propellers of FIG. 3 are for example HOCO Propellers of Hoffmann propellerworks Germany, namely types HO-V-62 of 1,6 to 2,4 meter diameter. The power plants are two or three four cycle or two cycle engines of Rotary Engine Kenkyusho and the propeller fluid motors and the pumps are also motors and pumps commercially availably from the said Rotary Engine Research institute at 2420 Isshiki, Hayama-machi, Kanagawa-ken, Japan. The pumps and motors are preferably corresponding to the inventor's USA patents 3,850,201; 4,037,523; 3,977,302 and other patents of the inventor. The power plants may be those of FIG. 8 and supply a take off power of 100 to 180 HP, each, according to type. Their weights are less than 100 Kg each. Spare parts for the power plants are available from stocks in all smaller cities around the world. The power plants are operating economically as four cycle engines do. For higher speed and for more than 2 persons, the craft of FIGS. 2 and 3 may have one or more gas-turbines of the roughly 300 HP range. For the 1 to 2 person version with four cycle power plants, the following datas, also they may change with time, will roughly apply today:

| Velocity = speed of the craft | fuel consumption per 100 Km flight | range without landing |
| --- | --- | --- |
| 280 Km/h | 29,2 ltr | 421 Km. |
| 260 Km/h | 23 ltr | 520 Km |
| 220 Km/h | 18 ltr | 670 Km |

| Velocity = speed of the craft | fuel consumption per 100 Km flight | range without landing |
|---|---|---|
| 150 Km/h | below 10 ltr | 1100 Km. |

The above values are a first information only and are subject to change without notice. The price of the crafts of FIG. 2 and 3 are supposed to be 90.000,—to 140.000,—German Marks or foreign currency equivalent. The present prices of prototypes are understandingly higher. For those who desire to get the respective craft for less money, the parts thereof can be obtained from the research institute of the inventor for home-building of the craft. Thus, the utilization of the craft for actual flying is presently possible for example under the rules of USA as experimental aircraft.

Since the vertical take off and landing crafts of FIGS. 2 and 3 can at bad weather land everywhere, even in the country side and the pilot and passengers can stay over the bad weather or over the night at the available hotels, motels, inns and resthouses, an expensive navigation-instrumentation can be spared, if so desired. The most important feature of such vertically flyable aircraft is anyhow, that a bad weather must not lead to an accident, just because there is no airport available for a quick landing. When an instrumentation is desired and the expenses for it are not feared, then it is recommendable to use a radar device of inventor's U.S. Pat. No. 3,801,046 for the automatic prevention of collusions with other craft or obstacles in the air.

In FIGS. 4 to 7 some examples of preferred details of the vertically and horizontally flighable craft are illustrated. However, sectional views through the hydraulik engine, hydraulic pumps and motors are not given in this application, because those are described in detail in about 400 patents of the inventor in many countries, about a hundred patents in the United States alone, and they are given in details in the mentioned "Handbook of my Flight-Technology" or in my respective "Handbooks on Hydraulics and Engines". The mentioned Handbooks also contain details of performances, test data, testing methods, sizes, powers, efficiencies-mechanic and volumetric, connection means, assembly rules and like, so that FIG. 4 and the other respective figures in this application can be restricted to schematic illustration.

In FIG. 4, the power plant, for example engine 11, drives a four-flow pump means or fluid flow creation means for the supply of four separated flows of proportionate or equal rates of flow in the separated flows, shown by numeral 1. Accordingly the power plants 12 and 13 drive respective four flow pump means 2 and 3. In each case, the power of the respective power plant is devided substantially into plural equal power portions in the said pumps. From each of the fluid-flow-creation means for multiple separated flows of equal rate of flow-in the following shortnamed "pump" or "pumps" four from each other separated and not with each other communicating fluid lines are extended to the respective fluid motors 4 to 7. Each one fluid line from the respective power plant's pump to a respective one of the motors 4 to 7. These fluid lines are not numbered in the figure, but demonstrated in the figure by lines whereon arrows are drawn to show the direction of flow of fluid in the respective fluid line. There are also return fluid lines provided in the craft, but those fluid lines for return fluid are not shown in FIG. 4. But, instead thereof arrows are marking the return flow from the respective return fluid lines of the fluid pipe structure. The other details of the return fluid lines and numbers of fluid lines are spared in FIG. 4, in order to prevent on overloading and difficulty of reading of FIG. 4. Details of fluid lines are shown by way of example in FIG. 7, so that such details are not required in FIG. 4. The arrows on the respective lines show clearly how the flows are flowing from the respective pumps to the respective motors and that is what counts in this figure.

It should however also be recognized that flows from different power-plant pumps which lead to the same fluid motor, may be combined to a combined flow. To do so, it is recommended to use one-way check-valves in the fluid lines to prevent return flow from one fluid line into the other. How that is done in detail is shown by way of example, in FIG. 6.

FIG. 6 demonstrates by way of example such combination of a plurality of flows from different power sources to a single fluid motor. Fluid lines 235, 335, 435 may come from different pumps of different power plants 1,11 and 2,12 and 3,13. One way check-valves 159 may be provided in said fluid lines. Each one in a respective one of the fluid lines. The valves 159 may be streamlined and may be guided in guide means 16%. After the valves 159- see the arrows to understand the meaning of "after",- the fluid lines combine to a single combined fluid line 135. This fluid line 135 goes therefrom to one of the motors 4,5,6 or 7. The pressure in the fluid line 135 presses the valves 15 to close towards the respective fluid line 235,335 or 435. When fluid flows in the fluid lines 235,335 or 435, the respective valve 15 is opened to let the flow flow from line 235 or 335 or 435 into the common combined fluid line 135.

But flow in the opposite direction, or back-flow, or flow contrary to the direction of the arrows in prevented by the automatic closing of the respective valves 159.

When there are three power plants, each with a four-flow pump in the craft and when four propeller motors shall be driven by four such combined flows, there will be four such valve-sets as in FIG. 6. Thereby each of four combined fluid lines 135 will receive about one fourth of the power of each of the three power plants. The number of flows and of pumps and engines is by way of example. Any other desired number may be materialized in such one-way check valve sets as in FIG. 6. Thus, each motor 4,5,6 and 7 will receive one combined flow 135 and thereby each of said motors will receive one fourth of the fluid supplied by the pumps and one fourth of the powers of each of the engines or power plants. The combination of several specific fluid lines from different engine-pump sets will not disturb the equalness of the rates of flow in the separated combined fluid lines 135, because the separated fluid lines 135 are not combined with each other. Care must however be taken, to connect the right fluid lines. If wrong fluid lines are combined, the desired effect can not be obtained.

While such combinations, as described in FIG. 6 may be done, it is not in all cases required to use them. That will be appearant from FIGS. 4 and 5. Because, the to be described fluid-pipe structure requires at least three fluid lines or at least two fluid lines plus a third stabilizing bar or pipe for the purpose of obtaining a self-bearing rigid fluid pipe structure capable of bearing and holding the respective motor(s) propeller(s) and/or wing-portion(s).

Figure 9:
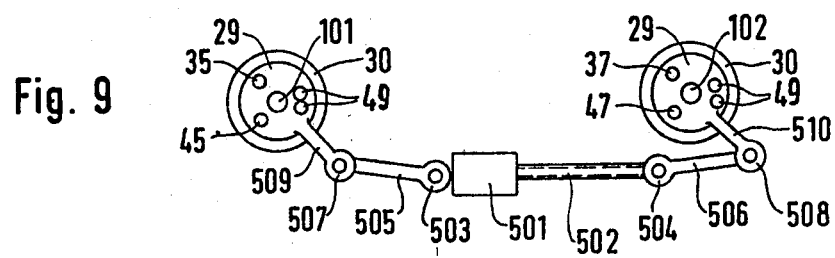
FIG. 9 shows a sample of an embodiment of a tilting or pivot-arrangement of the invention for the pivoting or tilting of the fluid pipe structure of the invention.

Returning now to FIG. 4, it will be seen, that the body 31 of the craft has bearings 29, which are pivotably borne in bearing sleeves 30. The bearing-bodies 29 are borne in bearing sleeves or bearing houses 30 and are able to pivot or to swing therein. The pressure fluid delivery lines 34 to 37 and/or 44 to 47 and the return fluid lines 49 are extended through the bearing bodies 29 and fastened therein. As seen in the figure, there are four bearing housings 30 and four bearing bodies 29 are pivotably borne therein. A cross-sectional view is seen in FIG. 9. The upper left bearing set 29-30 carries fluid delivery lines 35 and 45 and one or two return lines 49. The upper right bearing set 29-30 carries fluid delivery lines 37 and 47 and one or two return lines 49. The lower left bearing set 29-30 carries fluid delivery lines 34,44 and one or two return fluid lines 49. The lower right bearing set 29-30 carries fluid delivery lines 36 and 46 and one or two return fluid lines 49.

The fluid lines, which extend through the bearing sets as described are preferred to be fluid pipes. For example steel pipes or light-metal pipes. If steel pipes are used, they may have walls of 1,2 to 2,5 mm thickness. Steel-pipes have the feature to be easily weldable. At the innermost ends of the fluid pipes the pipes are open towards the interior of the body 31 of the craft, but they are at these ends provided with connection means for the pivotable connection to other fluid pipe portions or they have connection means for the connection of flexible pressure hoses. On the other ends, which constitute the outer ends, the respective fluid lines are fastened to a respective entrance- or exit- port of the respective fluid-motor 4,5,6 or 7. Instead of fastening them directly to the said motors, also here additional connection means or flexible hoses might be interposed. However, it is preterred not to do so, but fasten the other, the outer ends of the fluid pipes directly to the said fluid motors 4,5,6 or 7. On the inner ends however flexible connections to the fluid lines from the pumps are a must in order to maintain the seal of the separated fluid lines, when the bearing bodies 29 swing or pivot in the bearing housings or sleeves 30.

An important specificty of the invention is, that the fluid pipes, which were here described are utilized to form or to form together with additional means, the fluid-pipe structure for rigidly bearing the motors, propellers and -or wing portions at vertical and at horizontal flight and also in the Inter-Thrust range, when the fluid pipe structure is swung or pivoted in the bearing sets 29-30. For this purpose the combining connector portions 125 are provided to connect a respective right side structure with the leftside structure of the craft. The simplified term "structure" is used here and sometimes in the later part of the specification to indicate, that the said "fluid-pipe-structure" is considered by this single word. The connectors 125 are preferred to have rounded ends, which are connected to the ends of the respective fluid pipes of the left and right structure. It is preferred to weld the ends of the connectors 125 at a certain short distance before the inner ends of the fluid pipes to the fluid pipes. Rib-plates may be added. The feature of such arrangement is, that the fluid lines 34 to 37 and 44 to 47 as well as the return pipes 49 can then consist either of straight pipes or of pipes with only one bow and two straight ends. Such fluid pipes have the feature, that the interior of them can be cleaned easily from the straight ends. Such cleaning is important for every operation of a hydraulic or fluid circuit. For example, the welding of the connectors 125 to the structures will result in disturbation of the cleanliness of the inner face of the respective pipe and so will the welding of holding members for fastening of the fluid motors or the wing-portions. Consequently, after such welding and before the final assembly or filling of the fluid lines, the fluid pipes should be cleaned inside. For that purpose the straight ends of the pipes and the application of the connectors 125 with bows on their ends, are convenient and important. Fasteners 66 are either connected to the pipes or welded onto the respective fluid pipes 34 to 37 and 44 to 47. They have the purpose of easily fastening wing portions 24 to 27 or each one thereof thereon. The fasteners 66 may also serve to form and hold the airfoil-configuration of the respective wing portions 24 to 27.

FIG. 5 shows, how the fluid pipes are located by way of example and where the holders or fasteners 66 may be located relatively on the respective fluid pipes. Holders 14, which may be rivetts or bolts or other means, are set through the fasteners 66 to held the respective portions of the wing portions 24 to 27. The wing 125,225 may then consists of two or several parts, which are hold by means 14 on fasteners 66, or the wing portions may even consist of a single form-piece of a cross-section as shown in FIG. 6. Such one piece wing portion could then from the ends be just moved over the fluid pipe structure and then fastened by bolts or like 14 on the fasteners 66. Between the separated fluid pipes of the structure, ribs 5 may be set or welded.

Thus, the fluid pipes 34,44, 35 and 45 together with the internal connectors 125 and the ribs 59 between the pipes and connectors are forming one rigig fluid-pipe-structure which carries two fluid motors 4 and 5 and two propellers 14 and 15 and which may in addition carry the wing portions 24 and 25. This single structure is pivotably borne in in the left and right front bearing sets 29-30 of the craft.

The fluid pipes 36,46,37 and 47 together with the respective internal connectors 125 and the ribs 5 between the fluid pipes and the connectors are forming an other rigid fluid-pipe-structure which carries two fluid motors 6 and 7 and two propellers 16 and 17 and which may in addition carry the two wing portions 26 and 37. This other single structure is pivotably borne in the rear left and right bearing set 29-30 of body 31 of the craft. How the described fluid-line structures are pivoted in the mentioned bearing sets 29-30 is by way of example described in detail in FIG. 9.

The described fluid-line structures are an important part of the invention. Mechanically operated vertically and horizontally flying craft with four propeller and two wing sets have already been proposed, for example in U.S. Pat. No. 3,181,810 to N. C. Olson and in U.S. Pat. No. 3,184,181 to D. H. Kaplan. Those mechanically operated craft however are very heavy because they need bone-structures for the wings to carry the wings and they need mechanical transmission means with many gears for turns and angles and holders for the transmission means from the engines to the propellers. The transmission shafts must be able to transfer the high torques. These number of parts required summarized a too heavy weight. It is therefore very doubtful if such mechanically operated convertible aircraft can ever obtain an efficient operation or even an operation at all. They are not seen in flight presently. And, if they would fly, they would require strong power plants of extremely little weight, for example like gas-turbines. That makes them expensive in purchasing costs and expensive in flight because of a high fuel consumption. In those patents of the former art of mechanically operated convertible aircraft there has also never been a satisfactory mathematical analysis of the features or troubles and drawbacks of single- or multiple-propeller arrangements.

On contrary to those devices of the former art, the present invention brings a very detailed and very accurate mathematical analyzis of the powers and lifting capacities involved. The mathematics of the invention teach the higher carry- and lift-capacity of the multiple propellers at a given power supply.

The benefits of higher lifting and carrying capacity by the multiple propellers would however been lost again, when the mechanism to carry and drive the multiple propeller sets would be heavyer than the benefit of carrying capacity obtained thereby. It is here, where the weight of the fluid-pipe-structures and of the fluid motors, the fluid pumps, the engines and the quantity of hydraulic fluid to be carried are an important part of the invention.

For example; the four propeller craft of FIG. 2 will carry at 80 percent hydraulic efficiency about two times of what a conventional helicopter of equal power and equal propeller diameter would carry on gross weight. The 8 propeller craft of FIG. 3 would even have a still better carrying capacity of propeller if equal sizes would be used for equal total power installation.

From the gross lifting capacity however, the weights of the wings, fluid-line-structures, fluid motors and propellers are to be subtracted. The weights of them are therefore of high interest. They are presently in the prototype of FIG. 2 as follows: Weight of each fluid motor is 8,6 Kg. Weight of each variable propeller is 11 Kg. Weight of each double fluid-line structure for a left and right fluid motor and propeller is 14,5 Kg each. The pipes in said prototype are of 16 mm outside diameter and of 1,5 mm thickness of the walls. Thus, the weight of the sum of the fluid motors, propellers and fluidline structures in FIG. 2 is less than 120 Kilogramm. That is a little weight, compared to the benefit of lifting capacity obtained by the arrangement. In comparison only the difference between said 120 Kg and the weight of the rotors and tail-structure of the common helicopter is the amount of weight by which the craft of the invention is heayer than a conventional helicopter.

Quite naturally, at design and building of fluid line structures the laws of strength and rigidity must be obeyed. When the designs of the inventor are used, there is no risk of brake or unreliability and there is no risk of deformation. Also, it is important to use proper fluid motors. They are available from inventors patents and designs with single or double rotors, with releasable couplings, with automatic free-wheeling and with propeller-pitch adjustment devices, according to the situation of actual application. The user is however be cautioned, that at present time there are no other fluid motors than those of the inventor available which fulfill these conditions. The world is governed by conventional achsial piston motors, which are very good for ground applications and also for the drive of assessories in aircraft, but which are not of the required nature and capacity for driving propellers as such in the invention.

The fluid-drive separated flows of equal rate of flow system of the invention in combination with the little weight but strong fluid-pipe-structure of the invention are therefore an important means to reduce the weight of convertible aircraft and to increase their reliability and economy. In fact, the craft of the invention may be the first and until now sole convertible craft which can actually fly and do so with simple four cycle combustion engines.

On the wing portions 24 and 25 the ailerons 77 may be provided. The body 31 has mostly a side-rudder 9 and the rear wing portions 26 and 27 may be adjustable in its angle of attack in order to act as elevators in horizontal flight. As an alternative the wing portions 26 and 27 may also be pivoted in unison with the front wing portions and the rear wing portions 26 and 27 may then be provided with elevators 8. The rudder, ailerons and elevators may be operated mechanically, hydraulically, pneumatically or also electrically depending on the actual requirements and design. These details are not written in the figure, because they do not bring principally new systems. The known systems are just differently set in the aircraft of FIG. 4. New are however the FLUID-PIPE-STRUCTURES, the bearings of them, the extension of them through the bearing sets and other details thereof.

FIG. 5 which shows a sectional view along V—V of FIG. 4 demonstrates also, that the return fluid lines 4 may be set closely together in order to form a resistant triangular structure by the fluid lines for example 34,44 and 49,49. The return fluid lines 49 can also be combined to be a single fluid line. The triangular location on the corners of the triangle of the fluid-lines are part of the provision of rigidity and of strength of the fluid-pipe-structure. Together with the ribs 59 between the fluid pipes the fluid-pipe-structure is rigid enough to carry the fluid motors, propellers and wing portions without major deformation and without undesired vibrations. The fluid motors run smooth and without vibration anyhow and plural propellers of less diameter than a single big helicopter rotor run anyhow with much less vibration and unequal loads during a revolution than a big helicopter rotor does. Instead of using one-body or two body wings it is also possible to use wing-airfoil structure ribs and set thin covers over them. Instead of triangular location of the fluid lines rectangular placement, or placement of multiple forms like multiples are possible, if so required or desired.

In FIG. 5 a symmetric profile is demonstrated for the respective wing-portion. It is however also possible to use unsymmetric airfoils as in common aircraft. If those are applied, the airfoils should not be set absolutely vertically at take off or landing because they would supply a backwards directed movement. They would have to be tilted slightly forward for an actually vertical take off or landing. That will be described at hand of the later discussed FIG. 10.

Attention is further directed to the fact, that the wings in the FIGS. 2 and 3 are so dimensioned, that the propeller-streams flow over the major portion of the wings. Thereby the propeller-air-streams are providing an effect onto the wings so, as if the wing would fly through air. That provides lift, when the airfoil section is used or when the propellers are inclined relatively to the wing. The so obtained lift-action of the wings must be taken in consideration. It prevents to a great extend the possibility of stall of the aircraft; it prevents the brake down of the undisturbed airflow over the wings and it allows high angles of attack relatively to the ground at time of Inter-Thrust-Range "move" of the craft. That is a feature, which was seldom or even never to such extend obtained in any craft of the past.

There exists even the possibility to lift the aircraft in horizontal location just by flow of the propeller-streams over the wings. That however is a specifity which again is discussed in "Handbook of my Fligh-Technology". The dotted lines in the fluid motors of FIG. 4 demonstrate, that these motors may either by single rotor motors or double rotor motors, for example of USA Pat. No. 3,977,302 of the inventor. When those double-rotor-motors of said patent are used, the number of fluid lines are as in FIG. 4 or they may even be doubled for application in FIG. 3.

FIG. 9 shows a schematic cross-sectional view along the line IX—IX of FIG. 4 and demonstrates a sample of a pivoting device to pivot the front structure and the rear structure in unison. It may also be used in the craft of FIG. 3 or in others. In the bearing-bodies 29 are the therethrough extending fluid lines-fluid pipes- 35,45 or 37,47 etc. and also the return lines 49 provided and fastened. Control-fluid lines 101 and 102 may also extend through the bearing bodies 29 to be led from there to places to control propeller-pitches, propeller and fluid-motor retrcations, ailerons or elevators. Instead of control fluid lines mechanic, electric or other control means may also extend through the bearing bodies 29. The control means 101 may also extend to other controllers or rudders which are not mentioned here.

In body 31 of the craft the drive-motor 501 is provided and in the example of FIG. 9 the self-locking spindle 502 is extended through motor 501. Motor 501 drives the spindle 502 forward or backward to the left or right in the figure. Motor 501 is remote controlled from the cockpit by the pilot, when the craft is flown by a pilot or otherwise it may be remote controlled from the ground. The control of the motor 501 is the control of the pivot-action of the wings, motors and propellers and thereby a mojor piloting action. It controls the varyation from vertical flight through the Inter-Thrust-Range to horizontal flight and vice versa. The speed of vertical flight like landing and taking off may be controlled by the engine accell, the adjustment of rate of flow of variable pumps or by the propeller-pitch.

A selflocking spindle and motor 501 and 502 is here preferred in order that probable vibrations will not move the spindle when not desired. The self-locking effect also serves to maintain the angle of pivoting or the angle of attack relatively to the ground at times when no pivotation is desired. The bearing bodies 29 have in the figure arms 509 on the front bearing body and 510 on the rear bearing body 29. Intermediate arms 505 and 506 are placed between said arms 509 and 510 and the spindle 502 and connected to them in swingable connections 507, 503, 504 and 508. Thereby the for- or back-movement of the spindle 502 actuated by motor 501 pivotes the bearing portions 29 of the front structure and of the rear structure in unison. The rearward location of spindle 502 is for the horizontal flight and the leftmost location of spindle 502 is for the vertical flight, brake or backward flight of the craft. The locations between those locations of extremes define the angle of attack or the pivote angle of the propellers, motors and wings relatively to the ground and thereby the move in the Inter-Thrust-Range. The extension of the move of the spindle 502 into an extreme frontward position is suitable to obtain an effective braking effect or backflight in the air at times when an obstacle nears the flight path of the craft. A fast-speed motor 501 is suitable and often desired for fast action of vonversion from horizontal to vertical flight and vice versa. In common transport aircraft the pivot action may be suitable when it is slow, but in aircraft for sports and for acrobatics as well as for police or military craft the high speed motor 501 may be more desired.

The arrangement to control the pivoting action or said action in unison as shown in FIG. 9 is an example only. Any other reliable and suitable control mechanism may be applied if so desired.

It may also be mentioned, that one should not assume, that when the air-space would be overfilled with aircraft of this invention, that that would result in many accidents. Accidents are actually not required. Accidents are an appearance of high-speed aircraft, which lack the ability to rest in the air and which lack the ability to land at places which are no airports. The craft of the invention can fly in series or lines as cars are doing on the road and the already mentioned automatic radar controlled devices can automatically prevent collosions in the air. The devices of my patent 3,801,046 can also automatically force craft of the invention to fly behind each other with any given slow or high speed. It can also brake them automatically down to low speed, rest or back-movement. These means are as accurately possible as by cars on the road but even more better because of the automatic control by U.S. Pat. No. 3,801,046 which is not yet routine on cars on highways. In fact, the further possibility to pass another craft on a higher or lower flight level adds further safety and the fact that a craft in air has less resistance than a car on the road would even safe fuel, when an equal number of equal fast aircraft would fly in the air instead of cars running on the road. Those possibilities have been highly desired, but they were never obtained because the proposals of the past lacked the manoverability of the convertible craft and they failed to become airborne because of their too heavy weight or they were too uneconomic because of the meed of high power gas-turbines which can not be afforded by the average budget of average citizen.

In FIG. 7 one of those schematic plans is demonstrated, which the inventor prefers in the craft of FIGS. 2 to 4. Two power plants would be enough for the vertical take off and landing, but in this schematic three power plants 1,2,3 are provided. The third of them is there for the remote possibility, that one of the power plants would fail just during a vertical take off or landing. In horizontal flight a single power plant would be anough to be kept air-borne. In the figure the ret/urn fluid lines are not shown in order to keep the figure free from an overload of lines and in order to keep it by simplicity in a form for easier understanding.

One reason for the use of three engine-hydraulic power plants or two of them also is, that they are available in a suitable power range of 80 to 180 HP each in the inventor's research institute. Of these sizes two engines would be enough to operate a vertical start or landing; one engine set would be enough to remain airborne and the third set will be avaialable at an engine f/ailure at vertical flight. In practice all two sets or there sets are running together but with lower rates of power when lower power is required or satisfactory.

An automatic power control may be provided for overriding the pilot's control or for overriding by the control of the pilot, depending on the rate of perfectness and exten of installation of the craft. Overriding automatic controls can therefore by spared, when not desired or when they are too expensive for the user of the craft. An overriding automatic control may for example hold three power plants at ⅔ or ¾ of maximum power during operation, but when one of the engines fails automatically and immediately bring the two other power plants to full gas or power. The pilot may then feel, that his craft now ascends a little bit slower and thereby feel, that on of the engines has failed. He may continue his ascend to override an obstacle, like a tree, a house or like or may continue his flight, when he desires only a short distance flight, or he may start his landing manouver for repair or replacement of the third engine. Details thereof are again abtainable from "Handbook of my Flight-Technology".

At bigger size craft of the invention, for example in long-distance craft or intercontinental craft of the principles of figures 2,3,4,13 etc., the failure of one engine is no reason to stop the flight. At such bigger or longer distance craft such a number of power plants is applied, that the failure of one or two engines still allows the continuance of the flight. At Intercontinental or long distance craft the engines can even be repaired in flight or replaced in flight, because the engines and pumps are located in the body of the craft and they can be reached for repair by the mechanic. Engine-hydraulic power plants as in the invenion can be shut off from the fluid lines and the other sets of hydroengines can then continue to drive the craft. After repair of an hydraulic engine set it can be connected to the respective fluid lines again. The case of engine failure of an intercontinental craft of the invention over the ocean will even, when there are no means for repair, not prevent the aircraft from reaching its destination. It may just force the aircraft of the invention to continue the flight with slower speed and thereby to safe fuel—see equation (16)—which then would just result therein, that, when an engine failed over Paris, the New York bound craft would just—because of the engine failure—become able to fly not only to New York, but even to Chicago, just because it was forced to safe fuel because it has one engine less in operation. The only discomfort would be, that the flight would last a longer time.

The possibility of continuing travel even at engine failure and the possibility of repair of engines or transmissions at travel are nowadays not yet common even not in road traffic.

The four from each other separated pressure fluid flows of equal rate of flow which are produced in four separated working chamber groups with four separated outlets in the pumps 1,2,3—which may for example be pumps of inventor's USA patents as mentioned earlier—
extend as flows 61,71,81 and 91 from pump means 1 of power plant 11 to the upper rotors 4,5,6 and 7 of the four double rotor motors of for example USA Patent 3,977,302 of the inventor and help to drive them.

Similar four fluid flows extend from pump means 3 of power plant 13 as flows 63,73,83 and 93 to the lower rotors 54,55, 56 and 57 of the said fluid motors and help to drive them.

When—which should not happen—foreign particles, like dust or shavings enter one of the rotors and block the rotation of one of the rotors, the power plant will be stopped because of overloading. The other rotors will then continue to drive the shafts to the propellers. The communicated set of rotors in the motors, whereof one is blocked, are then overrun by the revolving shafts by one-way or free wheeling means thereof. Thus, even a blocking of a rotor of a propeller motor will not prevent the craft from flying.

The similar flows 62,72,82 and 92 are extending from the pump means 2 of power plant 12 over one way check valves as in FIG. 6 or over similar one way flow means to fluid lines of the other pump and engine sets. So, for example, fluid flow 62 enters over the valve into fluid line 61 and/or 81;
fluid flow 72 enters over the valve into fluid line 71 and/or 91;
fluid flow 82 enters over the valve into fluid line 63 and/or 83; and
fluid flow 92 enters over the valve into fluid line 73 and/or 93.

In case of blocking of one of the motor rotors the full power of the drive-set 2,12 will then flow in the rate of ¼ of the full power of set 2,12 into the other rotors of the four fluid motors and drive them accordingly in addition to the flow from the other still oparating drive set 1,11 or 3,13. In case, all rotors are healthy each of the rotors of the four motors will then obtain one eighth of the power of the drive-set 2,12.

It would also be possible to apply four, five or more drive sets, so, that the specific communication of drive set 2,12 can be spared. Instead of double rotor-motors it is also possible to apply single rotor propeller motors. At small craft as shown in FIGS. 2 and 3 it is however desired to limit the number of power plant sets in order to keep the total weight low for a smooth vertical take off and landing of the craft.

In this connection it should also be mentioned, that the world today is led by achsial piston pumps and motors. While those are suitable for ground application, it is not necessary, that they are also suitable for main propeller drives of vertically taking off aircraft, where the life of the pilot and of the passengers depends on the reliability of the pumps and motors. Under the decades long application of achsial piston motors the impression has arisen worldwide that only achsial piston pumps and motors are reliable and useful. Radial piston devices and radial chamber devices have for the medial and high pressure ranges almost disappeared from the markets during the fifties and sixtieth.

This historical development is however not entirely directional for application in aircraft. Because all achsial piston devices have connections between the pistons and the shoes or the drive flanges for the conrods to the pistons and of them to the pistons. Thus, when in such achsial piston device a dust partical of too big size and of too strong material would enter the clearance between the piston and the cylinder, the drive mechanism of the piston or for the piston would brake. Achsial piston motors are further single rotor motors. If in such motor such fatal brake would happen, such motor-brake would be fatal in a multi-propeller air/craft at least at vertical flight, like vertical take off or landing. This shows, that the reliability on ground and the almost force-governing of the hydraulic market by achsial piston devices can not give any absolute guarantee for safety in an aircraft of ability for vertical flight. It is rather highly riscful to use such achsial piston pumps and motors in vertically taking off and landing aircraft, because of the fatalness of sticking of a piston in a cylinder.

In the radial piston pumps and motors, which the inventor applies in vertical take off and landing aircraft, there are no connections between pistons, shoes and drive means, like piston stroke actuators or guides. The US Pat. Nos. 4,037,523 and 3,949,648 of the inventor clearly show, that the pistons, piston shoes and actuator or guide members are completely unconnected. The pistons and shoes float freely in a boardered space. When one of the pistons of them would stick in the cylinder because of an equally disastrous dust particle, that would not lead to a stopping or braking of the pump or motor. The sticked piston would just rest in the innermost location in the respective cylinder and the other pistons of the same rotor would continue to work. A respective pump or motor would just lose a seventh or nineth of power and its running and torque would become a little ununiform, but the sticking of the piston would not be fatal.

It may again be noted, that two power plants and pump sets would also be satisfactory, if correctly designed and build. In such case however, an engine failure during vertical flight might lead to a ceratain descend of the aircraft when not other emergency devices like auto-rotation of the propellers or the like would take an immediate action. Many fluid motors of the inventor include such automatic auto-rotation of the propellers in vertical flight like landing or taking off. It may be mentioned also, that in many countries the use of a single power plant is allowed by law to drive and operate a helicopter. Thus, even a single power plant may be operated in the craft of the invention, when a certified aircraft engine or like is used. The pump means may then be a four-flow, six-flow, eight-flow device, according to the actual situation. Instead of setting two wing-portion pairs onto the body of the craft it may also be possible to set one wing portion pair or three, four or more wing-portion pairs and propeller-pairs. The multiple arrangement is especially suitable when the aircraft shall serve as a weight carrying transporter.

The mentioning of an intercontinental aircraft of the invention shows, that there are presently not many limits as to the increase of the size of the aircraft. For the individual or for the family however a simple and inexpensive craft is the first desire. The sizes of the aircraft of the invention can even be reduced to smaller scales and be minimized in size. That however requires an increase of power of the power plants. The smaller the size as higher is the fuel consumption for a given carrying capacity. As larger the size of the aircraft is for a given carrying capacity as lower will mostly be the fuel consumption. That shows, that the economy of operation may increase with the outer dimension of the craft. The bigger sizes are otherwise trending however to more float in the air and beeing of slow motion and delicate to turbulence in the surrounding air, while the smaller dimensioned craft are less delicate at turbulent air, faster manouverable and speedier, but as the technological consequence also more expensive in operation and more fuel consuming. In small dimensioned craft, the four cycle engine may not be strong anough and small shaft-gasturbines may be required. They are adapted to drive the multi-separated flow pumps of the inventor. Such gas-turbines are extremely powerful at a very little weight. For example 300 or more horsepower at a weight of around 65 Kilograms. Details thereof are again visible in "Handbook of my Flight-Technology". However, such gas turbines have a certain fuel consumption. Applicant therefore attempted to utilize four cycle engines. It is not required to use common aircraft engines. The common aircraft engines have until now not prooven to be specifically suitable for the aircraft of the invention. They are too heavy, because they are designed to revolve with such revolutions which are suitable to flange the propeller onto the crankshaft of the engine. They also fail to have flanges, whereonto the pump sets could be fastened. In addition many of them fail to have the cooling fans for aircooling of the engine at vertical flight when there is no cooling airflow over the engine. Consequently straneous affords have been necessary over three decades to develop suitable hydrofluid conveying engines. They are now available in aircooled and also in watercooled versions, they are of little weight relatively, and they are also reliable in operation.

The weight-lift balance of the craft of FIG. 2 is presently, when 2,4 meter diameter propellers of Hoffmann composite light weigt types are applied, as follows:

Weights:
| | |
|---|---|
| Fluid motors 8 kg each (4 pieces) | = 32 Kg. |
| Propellers = 6 Kg each (4 pieces) | = 24 Kg. |
| Fluidpipe structure without bearings | = 18 Kg. |
| Fluid pipe structure bearings | = 10 Kg. |
| Wing skins (four sets) | = 52 Kg. |
| Light weight body | = 58 Kg. |
| one EHP power plant including pumps | = 99 Kg. |
| two 150 HP gasturbine EHP sets incl. pumps | = 102 Kg. |
| Pivoting control arrangement | = 10 Kg. |
| Flexible fluid hoses etc. | = 10 Kg. |
| Total; excluded personal and fuel and tanks: | = 415 Kg. |

Lifting capability:
Installed power = 410 HP max.
Available to the propellers = 308 HP.
Lift = ft = 12,3 × fn = 47 × fp = 1,8 = Lift max. = 1040 KG., which gives enough reservation for the pilot and fuel. When one of the main engines fails at start or landing proceedures with vertical wings and propellers, the power reduces maximally to 260 HP, giving into the propellers = 195 HP, whereby fp reduces to 34. Thereby the maximum of lifting capacity reduces to 1040×34/47=752 Kg. To prevent the remote possibility of engine failure at vertical flight with diffoculty of continuing to fly and to prevent accidents, that craft should not be loaded higher than to a total weight of 750 Kilograms. Thereby the craft obtains the ability to continue its move or hovering in the air, even, when one of the main engines fails during the critical period of vertical start or landing.

The weight-lift capacity balance of the exam/ple for the 2,4 meter propeller craft shows, how relatively low the weight of the structure of the invention is. The fluid motors are specifically designed to fit directly to the structure of the pipes of the invention. They can be fastened each by 14 M-8 inside hexagon bolts, also called cap srews. The propellers in this ample are non-variable pitch propellers. These have the feature, that they are extremely reliable. They are made practible in the invention by using variable DAY pumps of inventors patents or applications. At vertical lift the propellers require high torque to become revolved. The pump then run with smaller piston strokes for delivery of a lower quantity of highest pressure fluid. At later horizontal flight the propeller pitches which are non-variable are however then at a little angle of attack working because of the higher speed flight through the air. Thereby they are requiring less torque and can therefore revolve with higher rotary velocity to still beat in the air.

Figure 8:
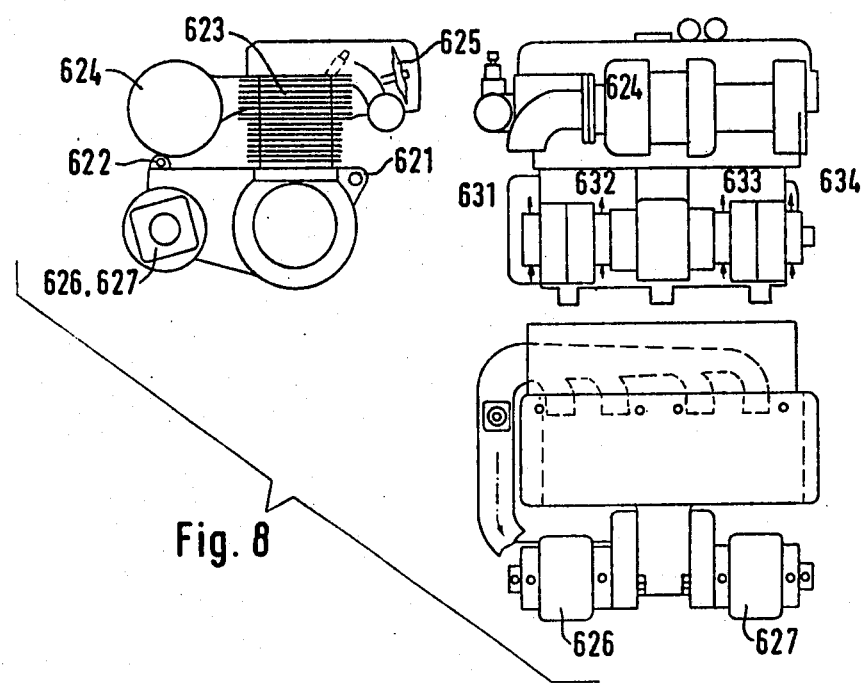
FIG. 8 shows an embodiment of a sample of the engine hydraulic power plant, which can be used in the invention and which is now commercially available from the laboratory of the inventor.

At the forwards flight speed of medial forward velocity of the craft, the two gasturbine EHP sets can be shutt off and the aircraft can then fly solely on the more fuel-saving EHP power plant of FIG. 8.

In this explained sample, the aircraft is an extremely safe craft. Because the constant pitch propellers are reliable and do not brake. No variable pitch arm fittings are there and they can not brake. At engine failure at only limited hight above the ground, the common helicopter may not have enough time to change to autorotation and may then crash. But the craft of the above example will not crash at an engine failure, because the remaining two engine hydraulic power plants will be enough to continue to carry the craft at hovering, flight or even slight ascent to overcome an obstacle in the flightpath. This is a feature, seldom obtained by a helicoptor or any other VTOL craft. These features are obtained by the structure of the pipes of the invention in combination with the holding of the motors, wings and driving of the propellers by the fluid through them. Because the savings obtained in weight by the invention are enough to employ the third power plant, the gasturbine-pump EHP set of 51 Kg of weight and 150 HP max, which are the spare engine for the safety at vertical take off and landing. Obviously no former art concept has made a craft with enough reduction of weigt to make the carrying of a safety providing plus-power engine possible in a VTOL aircraft which carries at vertical lift or descent the wings in addition to the propeller rotors. In each discussed EHP set the pumps are incorporated to the engine set and made to fit to the pipe structure of the invention. The fluid motors are made to fit also to the pipe structure of the invention and they are made to hold and drive the propeller as well as inclding the bearings for the holding of the propeller shaft, which in this case is the motor shaft. The thrust taking bearings are also in the fluid motors. All holdings, bearings and like of the former art have thereby been spared. Weight of the craft is reduced.

The sample of a hydraulic-engine power plant of FIG. 8 may be utilized as one of several possibilities to serve as drive set 1,11,2,12,3,13 of FIGS. 2 and 3 or 4 or as drive sets in other figures of this application. It consists of a combustion engine portion 623, a cooling means 625 which is commonly an air-cooling but may sometimes also be a water-cooling, a fastening means 621,622, a turbo-charger 624 and double-flow or multi-flow hydraulic pumps 626 and 627 with delivery ports 631 to 634 for the deli/very of four separated flows of fluid of equal rate of flow. One of the features of the sample of FIG. 8 is, that the power may be taken of from the crankshaft in the middle between a plurality of cylinders. So far that is generally known and exercised and has the feature, that the crankshaft can be of little weight. A specific feature of the invention however is, that two double-flow pumps can be mounted head to head into a single drive-wheel. The drive wheel may be driven from the crankshaft-middle by gears or a chain (or chains). The thrust forces or traction forces exercised onto the drive wheel by the chain or gear can at this arrangement be counter-acted by the forces of fluid in the cylinders of the pumps onto the rotors of the pumps. By this arrangement the resultant of load on the drive-wheel between the pumps can be reduced relatively to other arrangements or the wheel can even float between those opposing forces, whereby friction in the bearings of the drive wheel can be reduced.

In a practiaally applied sample of such powerplants, build by the inventor, the engine portion including the turbocharger weighs about 75 Kg including electric starter motor and can make about 100 to 120 HP depending on charge-pressure and fuel. As two-cycle engine according to an US patent application of the inventor it can make 150 to 180 HP at reduced weight of only about 70 Kg. The pump sets used in this power plant set are standard products of the inventor, can be obtained from the inventor and weigh according to respective type about 5,6 to 9,0 Kg. Each pump takes about one half of the power of the engine and delievers about a fourth of the power of the engine to each of the separated four flows. The power is however reduced by the efficiency losses in the pumps. These are however small.

The power plant for the delivery of separated flows of hydraulic fluid of FIG. 8 is however only one sample of the drive sets which are now avaible through the research institute of the inventor. For long-time or long-distance travel, watercooled engine sets without turbochargers are occasionally applied for the long distance flight, while gasturbines or engine sets as that of FIG. 8 are added and operated only at the short times of vertical flight.

Figure 10:
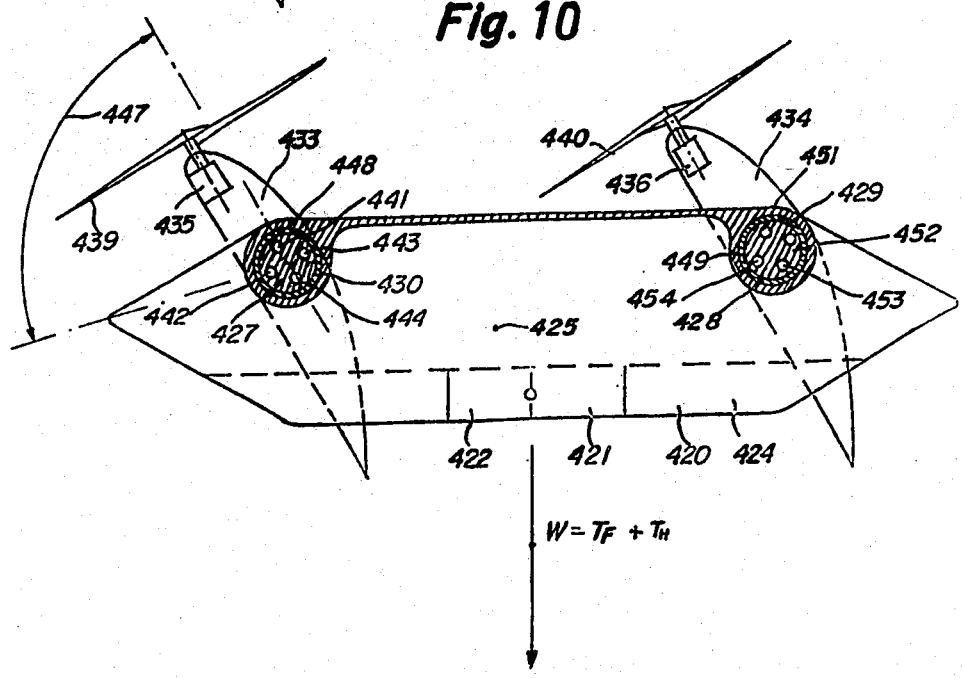
FIG. 10 is a longitudinal sectional view through another embodiment of the invention.
Figure 11:
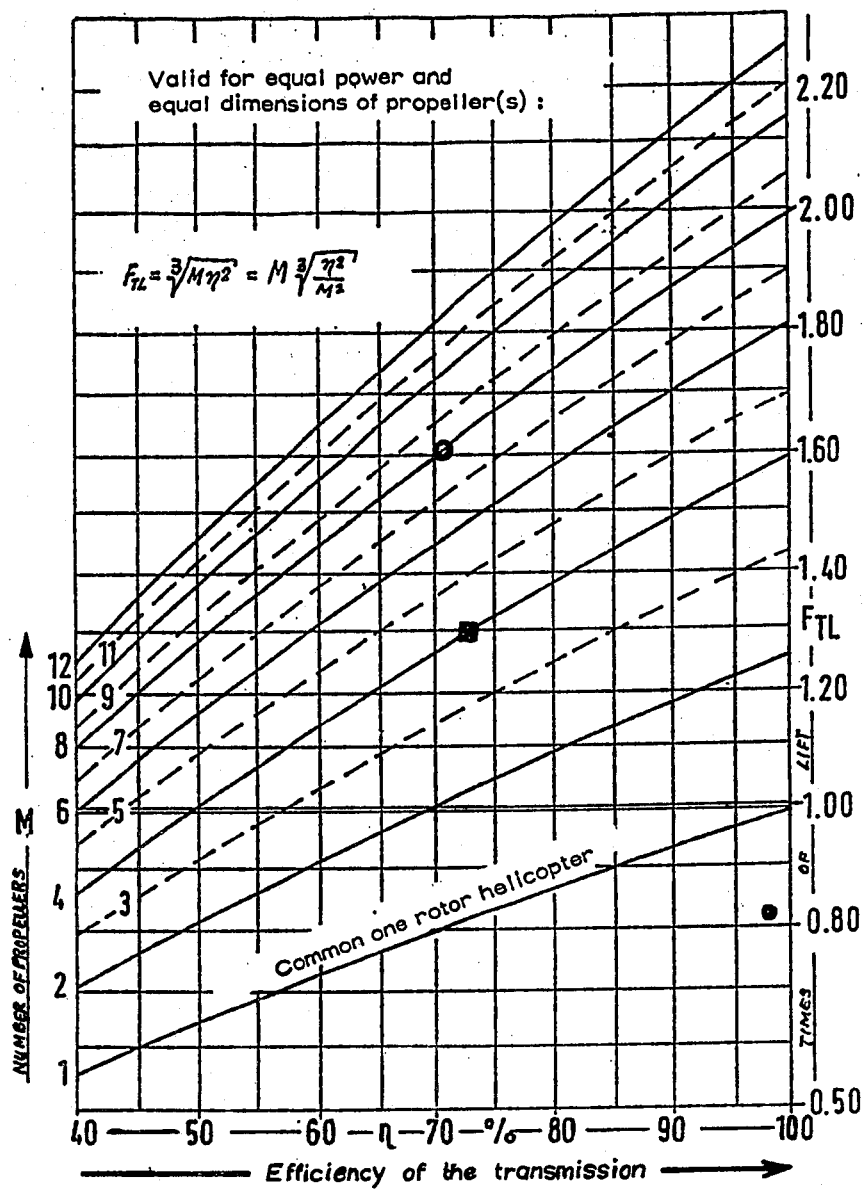
FIG. 11 is a schematic diagram which shows accurately the comparison factor FTL of the invention.

In FIG. 10 a double winged aircraft is shown, having a body 420 with a heavy weight compartment 424 and a freight or passenger cabine 425. The heavy weight compartment preferably contains the power plants, engines, pumps, 421 and 422 and other heavy material to form the weight centre in the middle, but low in the body 420 of the aircraft. The body 420 is also provided with two or more wing bearings 448 and 449 wherein the main bone-structures 430,429 of the wings 433,433 can be pivoted with said wings at an angular intervall 447. The main bar or main bone of the wings may contain fluid lines 442,443,444,441, 451,452,453,454 to fluid motors 435,436 for driving the said motors and thereby the propellers 439,440 which are associated to said fluid motors. Said fluid lines communicate respective chamber=groups of respective pump means with respective fluid motors.

The propellers 439,440 force air with high velocity over the wings 433,434. The profile of said wings then provides a wing-lift L which is named LF for the front wing and LH for the rear wing. The direction of said wing lifts LF and LH is however not upwards, but upwards to the rear as shown in the component arrow diagram of the figure when the wings have the angular pivote-position as shown in the figure. At same time the propellers 435,440 provide a traction S in the direction of the axis of propeller and fluid motor. Front traction is cited by SF and rear traction of propeller is cited by SH. The component of forces diagramm hows, that these forces SF plus LF summarize to the upward directed front force TF and at the rear of the craft the forces SH and LH summarize to the upward force TH. Both forces TF and TH are upwards directed, parallel to each other and equally distanced from the centre of the craft. The weight W is downward directed from centre 455. Forces TF plus TH and contrary directed force W keep the aircraft in straight position. Increasing the sum TF plus TH over W brings vertical upwards move of the aircraft. Equalizing gives hovering and decreasing of the sum TF+TH below W gives vertical sinking of the aircraft of the figure.

For forward flight both wings 433 and 434 are downward forwardly inclined within the range of angle intervall 447 depending on the desired flight path of the craft relatively to the horizontale.

It might be of interest, that the setting of the best angle of the wings relatively to the body and ground will increase the overall lifting capacity in vertical direction. In the craft of FIG. 2 for example, when it has 2,4 meter diameter propellers and 2,4 meter wings-portions of 2 squaremeter projection area, the best angle between SF and TF or SH and TH is about 12,5 degrees which is an inclination relatively to the body and the ground of about 77,5 degrees. The overall vertical lift is then 2,4 percent higher, than the vertical lift of the propellers without wings would be at vertical axes of the propellers.

The lift-weight balance becomes less favorable, when no gasturbines are applied and only the fourcycle power plan s of FIG. 8 are used. The better lift-weight balance is thereby more expensive.

A further feature of the invention is, that practically unbrakeable propellers can be utilized at certain embodiments. For example, propellers, which have a constant pitch, but which are made of a single piece of material. For example of wood, compound, plastic, metal. Integral arms are then extending oppositely from the medial portion or flange portion. The fluid motors include the bearings to bear the rotor, whereby the rotor of the motor acts as propellershaft and every propeller bearings of the former art are spared and not necessary. A good angle of attack for such fixed pitch one piece propellers is between 10 and 20 degrees. It should be understood however, that such propellers are not suitable for the known mechanically driven VTOL craft with pivotable wings. Because to make the application of fixed pitch propellers, which do not brake and which are of little weight only and which are inexpensive and reduce the weight and cost of the craft of the invention, it is necessary to apply a high torque to the propellers at vertical lift with slower propeller revolutions and to apply a higher rotary velocity with lesser torque to the propellers in the forward flight. Because in the forward flight the "Cw" value of the propeller goes down, because of the then smaller relative angle of attack to the air. But at hovering for example, the relative angle of attack in the air and to the air is higher, which gives a higher "Cw" value and therefore requires a higher torque. This problem is managed at a given power of the power plant(s) according to the invention thereby, that the delivery quantity of the pumps becomes made variable. The pumps 1,2,3, or 626,627 are then variable pumps. They then supply high pressure fluid at a lower rate of flow at vertical propeller axes, but higher rate of flow with medial pressure at the forward flight of the aircraft. The pipes of the structure must be of small diameters and their axes must be distanced from each other by multiples of their diameters in order to obtain the rigid structure, capable of carrying a load in two normal to each other planes.

The embodiments shown in the figures are examples only. When the rules of the invention are obeyed, many modifications, departing from the figures are possible without leaving the scope of the invention. Several embodiments of the application may be applied not only in vertical takeoff capable aircraft but also in horizontally flying, starting and landing craft. For example, the retractable propellers and fluid motors of the invention as well as the fluid-pipe-structures of the invention, which carry the wings, whereby the wings carry the craft.

The application shall further serve to give a first impression about the many possibilities which arise by the utilization of the drive and control-systems of the invention. For an understanding of all technological details and calculations the study of the "Handbook of my Flight-Technology" is highly recommended, because to designing and building of aircraft more knowledge is required than just the teaching of a patent application. The mentioned handbook is a compact short-cut on 600 pages (about) of the 50 million words and test records, which have over 30 years of intensive work led to the less weight, compact and powerful devices like power plants and hydraulic devices, bone structures and other details of the invention.

Of the many possibilities this short patent application can bring only a few examples and embodiments. The sizes which are shown in the specification bring also only a few of many different sizes and powers. The mentioning of sizes and powers in the application shall therefore not give the impression that the invention is materialized in practical building and testing only for the specific sizes given. The "Handbook of my Flight-Technology" contains on its end the numbers and titles of about 400 patents of the inventor and also the numbers and titles of about an equal number of scientific reports and test-reports, development reports and like.

The factors "fl", "fp", and "fn", which are used in the lift to weight balance of the example, are taken from the mentioned book "Mini Introduction to a new technology" and they are the lift factor "fl" defined by the number of the propellers, the propeller factor "fp" defined by the diameter of the propeller's) and the power factor $\mp$fn" defined by the HP which are supplied into the respective propeller(s).

In summary, the embodiments of the invention consists at least of:

(1.) In an aircraft in combination; a novel arrangement, which comprises: a body 31, at least one power plant 10, at least four propellers, 14 to 17 at least two pairs of wing-portions 24 to 27, fluid transmission means including fluid motors 4 to 7 between said power plant 10 and said propellers 14 to 17 to drive said propellers by said motors, means 501 etc. to varify the angle of said wings and propellers relatively to ground, means 1,2,34,35,44,45, 4 to 7 etc., to synchronize the rotary velocity of said propellers 14 to 17 and a novel structure;

wherein said novel structure includes at least three pipes, f.e.: 34,44,49 etc., whereof at least one pipe 49 is laterally located of the at least two other pipes 34 and 44 and the distances of the axes of the pipes 34,44,49 are multiples of the diameters of the pipes, wherein at least two of said pipes f.e.: 34 and 49 or 44 and 49 or 34,44,49 etc. are utilized as fluid lines to carry fluid to and from said motors; f.e. 4 or 5,6,7 wherein said structure includes ribs 59 between said at least three pipes 34,44,49 to prevent deformation and dislocation of said pipes relatively to each other;

wherein said pipes and said ribs are forming a rigid structure, f.e. 34,44,49,59 of capability to carry a load, wherein the outer ends of at least two of said pipes are connected to ports of one of said motors; f.e. 4,5,6,7 wherein said structure carries and holds on said outer ends of said pipes, i.e. 34,44,49 at least one of said motors; f.e. 4,5,6,7 wherein holding means 66 are provided on said structure, f.e. 34,44,49,59 wherein said holding means are utilized to hold and carry at least one of said wing-portions; f.e. 24; or 26,27,25;

wherein said structure includes a pivotable bearing means; 29, wherein said bearing means is carried in a bearing housing 30 provided on said body, 31, wherein the inner ends of at least two of said pipes are flexibly connected to ports of a pump means 1,2 or 3 in said transmission to carry fluid from said pump to said pipes and vice versa;

whereby said structure provides in combination: the holding of said motor, the holding of said wing, the temporary varification of the relative angles of said propellers and of said wings relatively to the ground, the transfer of motor-driving pressure fluid to said motors to drive said propellers and the carrying of said body by said wings and said propellers during operation of said aircraft in the air. or, in addition;

(9.) The aircraft of 1, wherein said propellers 14 to 17 are fixed pitch propellers of single body configurations with arms extending radially from a medial flange portion, said arms are integral with said flange portion, and the angles of attack of the arms of said propeller are set to work with best efficiency at a predetermined forward speed of the craft, and wherein said fluid transmission means includes pumps, 1,2 or 3 or 626,627, which are variable pumps and which ar working with the maximums of said forward speed of said aircraft, while their strokes and delivery quantities are reduced to shorter strokes and smaller quanitities of deliveries of fluid, but set to deliver higher pressure in fluid, when said propellers are departed with their axes substantially away from the horizontal direction of the said axes of said propellers. or:

(10.) The aircraft of 1, wherein the length of the laterally from the body of the craft extending wing portions 24 to 27 are almost equal in length to the diemeters of said propellers 14 to 17 and their projection area equals one third to one half of the cross-sectional area of the respective propeller, and, wherein for hovering and vertical movement of said aircraft the wings and the axes of the propellers are inclined forwardly under an angle of 12,5 plus minus 5 percent in order to increase the lift of the craft by the summation of the propeller thrust components and the lift components of the wing portion to a substantially vertically directed lift which exceeds the thrust of the propellers. or; at least (2.) In an aircraft in combination; a novel arrangement, comprising: a body 31, at least one power plant 10, at least four propellers, 14 to 17, at least two pairs of wing-portions 24 to 27, hydrostatic fluid transmission means including a pump 1,2 or 3, arrangement and fluid motors 4 to 7 between said power plant and said propellers to drive said propellers by rotors of said motors with one propeller each fastened to at least one rotor of one of said motors, means 501, 29, 30 etc. to varify the angles of said wing-portions and propellers relatively to the ground, synchronization means f.e.: 1,2,3,34,44 etc. in said hydrostatic transmission means to synchronize the rotary velocities of said propellers 4 to 7 or 140,150,160,170, and a novel structure in a plurality of such novel structures;

wherein said novel structure includes at least three pipes; 34,44,49 or others;

wherein one of said pipes f.e. 49 is located laterally of the other two, 34,44, of said at least three pipes;

wherein said structure includes ribs 59 between said at least three pipes to prevent deformation and dislocation of said pipes relatively to each other;

wherein said pipes and said ribs are forming a rigid structure of a capability to carry a multi-directional load of at least two components of directions of load whereof one of said components is substantially normal to the other of said components of directions of load;

wherein said pipes with the exception of a probable slight inclination relatively to each other are substantially parallel to each other and are of diameters of a fraction of the distances of their axes from each other;

wherein the outer ends of at least two of said at least three pipes are connected to ports of one of said motors;

wherein said structure carries and holds on said outer ends of said pipes at least one motor of said motors;

wherein at least two of said pipes are utilized as hydrostatic fluid delivery - and fluid return - lines to load fluid from said pump arrangement f.e 1,2,3, to aid motor f.e. 4,5,6,7 and from said motor at least indirectly back to said pump arrangement;

wherein holding means 59 are provided on said structure;

wherein said holding means are utilized to hold and carry at least one portion of said wing-portions; 24,25,26,27 wherein said structure includes a pivotable bearing means; 29, wherein said bearing means 29 is pivotably borne in a bearing housing, 30, which is provided on said body; 31, wherein said pump arrangement delivers plural separate fluid pressure flows f.e.: 34,35 of proportionate rates of flow equal in number of the number of said motors f.e. 4 to 7 and equal to the number of said propellers; f.e.; 14 to 17;

wherein each of said delivery fluid lines passes one of said separate flows of proportionate rate of flow to one of said motors to assure by said proportionate rates of flows proportionate angular rotary velocities of the rotors of said motors and thereby of said propellers; and;

wherein the inner ends of at least two of said at least three pipes are movably connected to ports of a pump means of said pump arrangement in said transmission to lead fluid from said pump arrangement to said pipes and vice - versa;

whereby said structure provides in combination;

a; the holding of said motor; f.e.: 4 to 7;

b; the holding of said wing-portion; f.e.: 24 to 27;

c; the temporary varification of the relative angle of said propeller and of said wing-portion relatively to the ground and to said body;

d; the transfer of motor-driving pressure fluid of a rate of flow proportionate to the respective rate of flow of fluid in an other structure of said plurality of structures to and from said motor to drive said propeller with a rotary angular velocity proportionately relatively to the rotary angular velocity of an other of said propellers and whereby said structure also provides e; the carrying of said body 31 by said wing - portion f.e.: 24 to 27; and said propeller f.e.: 14 to 17; during operation of said aircraft in the air. or; in addition:

(3.) The aircraft of 2, wherein two of said structures 34,44,49 and 35,45,49 are combined together on their inner portions to form a common structure with oppositionally directed outer portions, wherein connecters which include at least three medial connection pipes 125 are provided on the inner portions of said structures to connect said structures rigidly;

wherein each of said inner portions of said structures is provided with one of said bearing means 29 and wherein said bearing means are pivotably borne in a pair of bearing housings 30 of said body.

(4.) The aircraft of 3, wherein said medial pipes 125 of said connecters are fastened to said pipes 34,44,49; 35,45,49, of said two of said structures in a small distance from the said inner ends of said pipes of said structures and said medial connection pipes of said connecters include laterally bended portions of the ends of said medial connector pipes to permit open inner ends of said pipes of said structures for cleaning of the interiors of said pipes and for smooth connection of said pipes to at least partially movable fluid lines 61,62,72,73,81,82,91,92,63,71,83 or 93 beween said inner ends of said pipes of said structures and said pump means 1,2,3, of said pump arrangement, while said medial connection pipes form between said bended portions on their ends medial connecter portions of substantially parallel axes and one of said medial connecter portions laterally to others of said medial connecter portions.

(5.) The aircraft of 3, wherein at least two of said combined structures 34,35 etc. and 36,37 etc. are provided, one thereof on the front - portion and one thereof on the rear portion of said aircraft, 37, whereby said aircraft obtains at least four propellers 14 to 17 or additionally 140,150,160,170, and at least four wings 24 to 27 with each two thereof oppositionally directed and located relatively to the longitudinal medial vertical plane through the body of said aircraft.

(6.) The aircraft of 5, wherein a common control means f.e.: 501 to 510 is provided and attached to said structures 35,45,49 etc., to incline the angles of said wings 24 to 27 and the axes of said propellers 14 to 17 in unison in proper relation to each other relatively to the ground and to said body 31.

(7.) The aircraft of 2, wherein the axes of said propellers 14 to 17 are slightly inclined relatively to the angle of attack of said wings, 24 to 27.

(8.) The aircraft of 5, wherein said propellers 14 to 17 or 14 to 17 and 140,150,160,170, have diameters in proper relation to the length of said wings 24 to 27 in order to create a lifting effect on said wings by the stream of air which is blown by said propellers over said wings.

What is claimed, is:

1. In an aircraft in combination;

a body, at least one power plant, at least four propellers, at least two pairs of wing-portions, hydrostatic fluid transmission means including a pump arrangement and fluid motors between said power plant and said propellers to drive said propellers by rotors of said motors with one propeller each fastened to at least one rotor of one of said motors, means to varify the angles of said wing-portions and propellers relatively to the ground, synchronization means in said hydrostatic transmission means to synchronize the rotary velocities of said propellers and a novel structure in a plurality of such novel structures;

wherein said novel structure includes at least three pipes;

wherein one of said three pipes is located laterally of the other two of said at least three pipes;

wherein said structure includes ribs between said at least three pipes to prevent deformation and dislocation of said pipes relatively to each other;

wherein said pipes and said ribs are forming a rigid structure of a capability to carry a multi-directional load of at least two components of directions of load whereof one of said components is substantially normal to the other of said components of directions of load;

wherein said pipes with the exception of a probable slight inclination relatively to each other are substantially parallel to each other and are of diameters of a fraction of the distances of their axes from each other;

wherein the outer ends of at least two of said at least three pipes are connected to ports of one of said motors;

wherein said structure carries and holds on said outer ends of said pipes at least one motor of said motors;

wherein at least two of said pipes are utilized as hydrostatic fluid delivery - and fluid return - lines to lead fluid from said pump arrangement to said motor and from said motor at least insdirectly back to said pump arrangement;

wherein holding means are provided on said structure;

wherein said holding means are utilized to hold and carry at least one portion of said wing-portions;

wherein said structure includes a pivotable bearing means;

wherein said bearing means is pivotably borne in a bearing housing which is provided on said body;

wherein said pump arrangement delivers plural separate fluid pressure flows of proportionate rates of flow equal in number to the number of said motors and equal to the number of said propellers;

wherein each of said delivery fluid lines passes one of said separate flows of proportionate rate of flow to one of said motors to assure by said proportionate rates of flows proportionate angular rotary velocities of the rotors of said motors and thereby of said propellers;

wherein the inner ends of at least two of said at least three pipes are movably connected to ports of a pump means of said pump arrangement in said transmission to lead fluid from said pump arrangement to said pipes and vice - versa;

whereby said structure provides in combination;

a; the holding of said motor;

b; the holding of said wing-portion;

c; the temporary varification of the relative angle of said propeller and of said wing-portion relatively to the ground and to said body;

d; the transfer of motor-driving pressure fluid of a rate of flow proportionate to the respective rate of flow of fluid in an other structure of said plurality of structures to and from said motor to drive said propeller with a rotary angular velocity proportionately relatively to the rotary angular velocity of an other of said propellers and whereby said structure also provides e; the carrying of said body by said wing - portion and said propeller during operation of said aircraft in the air;

wherein two of said structures are combined together on their inner portions to form a common structure with oppositionally directed outer portions, wherein connecters which include at least three medial connection pipes are provided on the inner portions of said structures to connect said structures rigidly;

wherein each of said inner portions of said structures is provided with one of said bearing means and wherein said bearing means are pivotably borne in a pair of bearing housings of aid body; and;

wherein said medial pipes of said connecters are fastened to said pipes of said two of said structures in a small distance from the said inner ends of said pipes of said structures and said medial connection pipes of said connecters include laterally bent portions on the ends of said medial connecter pipes to permit open inner ends of said pipes of said structures for cleaning of the interiors of said pipes and for smooth connection of said pipes to at least partially movable fluid lines between said inner ends of said pipes of said structures and said pump means of said pump arrangement, while said medial connection pipes form between said bended portions on their ends medial connecter portions of substantially parallel axes and one of said medial connecter portions laterally to others of said medial connector portions.

* * * * *